US010971879B1

(12) United States Patent
Cowham et al.

(10) Patent No.: US 10,971,879 B1
(45) Date of Patent: Apr. 6, 2021

(54) ELECTRICAL CONNECTION FORMING TOOL

(71) Applicant: Cowham Innovations, LLC., Quincy, MA (US)

(72) Inventors: Walter Cowham, Quincy, MA (US); Jeremy Cowham, Quincy, MA (US)

(73) Assignee: Cowham Innovations, LLC., Quincy, MA (US)

( * ) Notice: Subject to any disclaimer, the term of this patent is extended or adjusted under 35 U.S.C. 154(b) by 0 days.

(21) Appl. No.: 16/991,509

(22) Filed: Aug. 12, 2020

(51) Int. Cl.
*H01R 43/00* (2006.01)
*B23P 19/00* (2006.01)
*H01R 43/042* (2006.01)

(52) U.S. Cl.
CPC .................................. *H01R 43/042* (2013.01)

(58) Field of Classification Search
CPC .................................................... H01R 43/042
See application file for complete search history.

(56) References Cited

U.S. PATENT DOCUMENTS

| | | | | |
|---|---|---|---|---|
| 4,589,719 | A | 5/1986 | Gentry | |
| 4,918,258 | A | 4/1990 | Ayer | |
| 4,997,388 | A | 3/1991 | Dale et al. | |
| 5,064,386 | A | 11/1991 | Dale et al. | |
| 5,097,099 | A | 3/1992 | Miller | |
| 5,188,541 | A | 2/1993 | Comerci et al. | |
| 5,295,857 | A * | 3/1994 | Toly | H01R 4/2433 439/395 |
| 5,582,822 | A | 12/1996 | Johnson | |
| 5,857,259 | A | 1/1999 | Johnston | |
| 6,027,367 | A | 2/2000 | Woertz et al. | |
| 6,083,053 | A * | 7/2000 | Anderson, Jr. | H01R 24/84 439/687 |
| 6,371,435 | B1 * | 4/2002 | Landis | H02B 1/052 248/694 |
| 6,945,815 | B1 | 9/2005 | Mullally | |
| 7,648,379 | B2 | 1/2010 | Johnson et al. | |
| 10,622,768 | B1 * | 4/2020 | Cowham | H01R 4/46 |
| 2003/0181092 | A1 | 9/2003 | Negishi et al. | |
| 2013/0058711 | A1 * | 3/2013 | Van Der Linde | F16M 13/02 403/349 |
| 2016/0022374 | A1 * | 1/2016 | Haider | A61B 17/142 606/96 |

* cited by examiner

*Primary Examiner* — Paul D Kim
(74) *Attorney, Agent, or Firm* — Caldwell Intellectual Property Law

(57) ABSTRACT

An electrical connection forming tool, the tool including a wire forming die module, including a module housing, including a front side, the front side including a chamber configured to align with an electrical plug; a back side; and an inner compartment, the inner compartment including a coil sliding body feature, and configured to interface with the electrical plug; a die, configured to accept a wire and imprint the wire on the electrical plug; a locking feature; and a cover for the locking feature; an actuator, configured to force the electrical plug into an actuator housing positioned to interface the die; and an actuator housing, connecting the wire forming die module to the actuator; and including an opening configured to accept the electrical plug and communicate with the die and the chamber; and a structural chassis.

18 Claims, 28 Drawing Sheets

1400

2100

ELECTRICAL CONNECTION FORMING TOOL

FIELD OF THE INVENTION

The present invention generally relates to the field of electrical connections. In particular, the present invention is directed to an electrical connection forming tool.

BACKGROUND

Currently available circuit wiring products contain minimal safety features and require tedious assembly entirely by hand. Furthermore, assembly can take time and cause delays during construction operations. In addition, electrical connections made by hand can be difficult to use for plug and play wiring systems.

SUMMARY OF THE DISCLOSURE

In an aspect, an electrical connection forming tool, the tool comprising a wire forming die module, the wire forming die module comprising a module housing, wherein the module housing includes a front side, the front side including a chamber configured to align with an electrical plug; a back side; and an inner compartment, the inner compartment including a coil sliding body feature, the coil sliding body feature configured to interface with the electrical plug; a die and the die is configured to accept a wire and imprint the wire on the electrical plug; a locking feature; and a cover for the locking feature; an actuator, wherein the actuator includes a first end and a second end; and the actuator is configured to force the electrical plug into an actuator housing positioned to interface the die; and an actuator housing, wherein the actuator housing connects the wire forming die module to the actuator; the actuator housing includes an opening configured to accept the electrical plug and communicate with the die and the chamber; and the actuator housing comprises a structural chassis.

In another aspect, a method of manufacturing an electrical connection forming tool the method comprising selecting, a wire forming die module, the wire forming die module comprising a module housing, wherein the module housing includes a front side, the front side including a chamber configured to align with an electrical plug; a back side; and an inner compartment, the inner compartment including a coil sliding body feature, the coil sliding body feature configured to interface with the electrical plug; a die, and the die is configured to accept a wire and imprint the wire on the electrical plug; a locking feature; and a cover for the locking feature; and connecting, an actuator and an actuator housing to the selected wire forming die module.

In another aspect, a method of creating an electrical connection using an electrical connection forming tool the method comprising loading a wire and an electrical plug into an electrical connection forming tool; sliding a wire forming die module onto the electrical connection forming tool and engaging a locking feature; pumping the electrical connection forming tool; and ejecting the electrical plug containing an imprinted wire.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an electrical connection forming tool. In an embodiment, an electrical connection forming tool includes a wire forming die module, including a module housing, configured to align with an electrical plug. A module housing includes an inner compartment, including a coil sliding body feature, configured to interface with an electrical plug. A wire forming die module includes a die configured to accept a wire and imprint the wire on an electrical plug. A wire forming die module includes a locking feature and a cover for the locking feature. An electrical connection forming tool includes an actuator, wherein the actuator is configured to force an electrical plug into an actuator housing positioned to interface a die. An electrical connection forming tool includes an actuator housing, wherein the actuator housing includes an opening configured to accept an electrical plug and communicate with a die and a chamber. An actuator housing includes a structural chassis.

Figure 1:
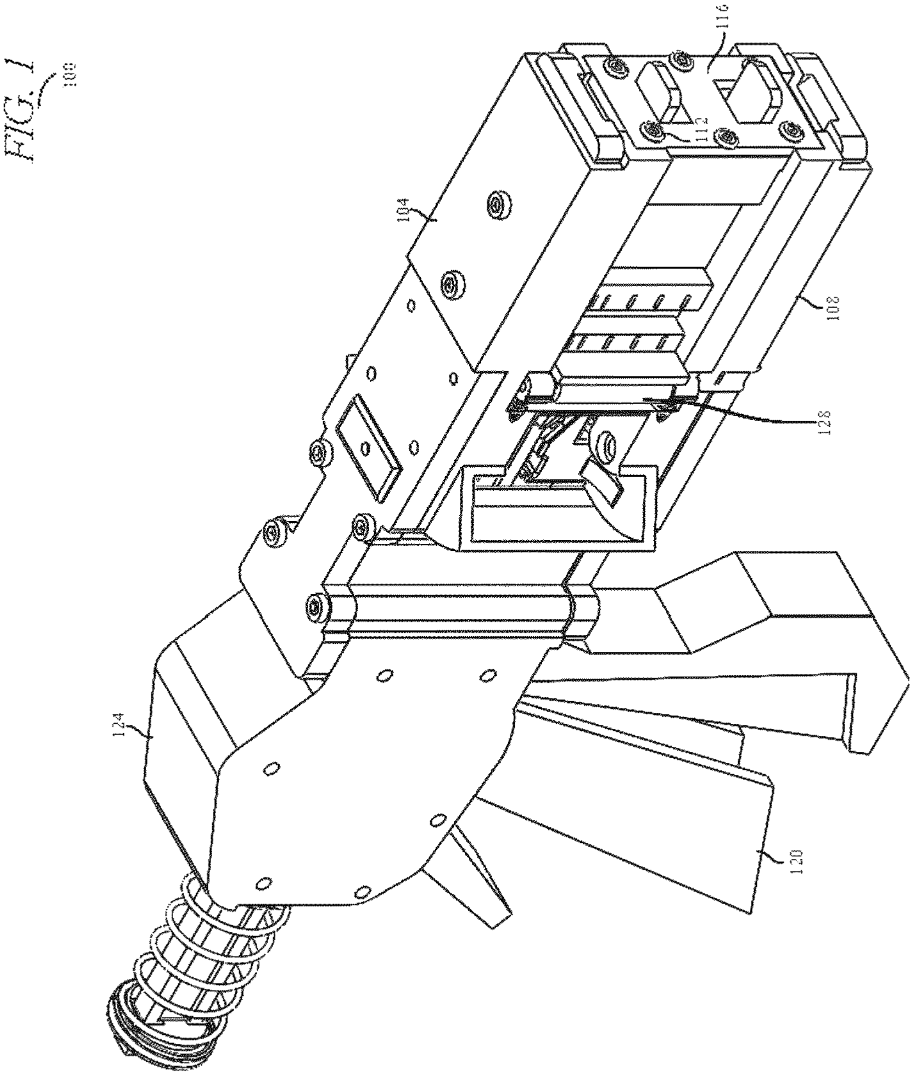
FIG. 1 is a schematic diagram illustrating an exemplary embodiment of an electrical connection forming tool.

Referring now to FIG. 1, an electrical connection forming tool 100 is illustrated. Electrical connection forming tool 100 includes a wire forming die module 104 which can include a detachable component. A "detachable component," as used in this disclosure, is an object that is capable of being removed from electrical connection forming tool 100, with or without tools and/or both. A detachable component may include one or more mechanical joints, such as but not limited to a pin joint, a prismatic joint, a ball joint, a knuckle joint, a turnbuckle, a cotter joint, a bolted joint, a screw joint, and/or a universal joint. A detachable component may include a slide and clip component, where a wire forming die module 104 may slide and attach to electrical connection forming tool 100, and clip into place. A clip may include an object that allows wire forming die module 104 to grip electrical connection forming tool 100 and be held in place. A clip may be composed of one or more materials including but not limited to, metal and/or plastic. Wire forming die module 104 may attach to electrical connection forming tool 100 using an attachment feature such as but not limited to a screw, a nut, a bolt, a washer, a fastener, and the like.

With continued reference to FIG. 1, wire forming die module 104 includes a module housing 108. Module housing 108 may be composed of a variety of materials including plastic and/or metal. Module housing 108 includes a front side, the front side including a chamber configured to align with an electrical plug. Chamber may include a groove configured to house an electrical plug. Chamber may be of a certain length, width, and/or depth to accommodate an electrical plug. An electrical plug includes any electrical plug configured to be inserted into a receptacle. An electrical plug may be electrically insulating and may protect a user from electrocution. An electrical plug may include a male ended electrical plug, and/or a female ended electrical plug. A female ended electrical plug may include a receptacle that may hold a protrusion found on a male ended electrical plug. Chamber includes a prong configured to flatten a wire onto an electrical plug. A "prong," as used in this disclosure, is a pointed and/or projected object. A prong may have a "tooth" like appearance. A prong is configured to flatten a wire onto an electrical plug. A prong flattens a wire and embeds the wire onto an electrical plug. A "wire," as used in this disclosure, is a strand and/or rod of metal, configured to bear electricity, telecommunication signals, and/or mechanical loads. A wire may include a power transmission wire, including any wire involved in the movement of electrical energy. A wire may include a communication wire, including any wire that sends and/or receives computer data, television data, sound data, telemechanical data, telecommunication data, telephone data, photograph data and the like. A communication wire may include transmission media that may include optical fiber, coaxial conductors, copper conductors, ethernet, and/or twisted wire pairs. A communication wire may include a wire that may be utilized to control lighting, climate, entertainment systems, appliances, home security, building access, alarm systems and the like. A communication wire may include a wire that may connect with the internet and may be part of the internet of things. In an embodiment, a prong may interface with a depression located on an electrical plug. A depression may include a channel configured to house a wire, such as but not limited to a socket. For example, an electrical plug may contain five channels that may house five wires including a hot wire, a neutral wire, a ground wire, and two communication wires. A prong may align with one or more depressions located on an electrical plug and imbed a wire into a depression. In an embodiment, electrical contact points formed by a bare conductor located on an outer surface of an electrical plug may correspond to a female shaped prong located within electrical connection forming tool.

With continued reference to FIG. 1, wire forming die module 104 includes a back side, and an inner compartment. Inner compartment includes a coil sliding body feature. Coil sliding body feature is configured to interface with an electrical plug. Coil sliding body feature may include a spring that aids in aligning chamber with an electrical plug and flattening a wire onto an electrical plug. A "spring," as used in this disclosure, is a flexible object that stores mechanical energy. A spring may be composed of one or more flexible materials including for example, steel, phosphor bronze, titanium, beryllium copper, and the like. A spring may include a coil spring, a tension spring, a compression spring, a torsion spring, a constant spring, a variable spring, a flat spring, a machined spring, a serpentine spring, a garter spring, a cantilever spring, a helical spring, a volute spring, a balance spring, a leaf spring, a v-spring, a Belleville spring, a constant-force spring, an ideal spring, a mainspring, a negator spring, a wave spring, a progressive rate coil spring, and the like. In an embodiment, coil sliding body feature may include one or more prongs that may aid in flattening a wire onto an electrical plug, including any of the prongs as described above in more detail. A prong may include any of the prongs as described above in more detail. Coil sliding body feature may be positioned below a wire, as the wire is laced across a prong.

With continued reference to FIG. 1, wire forming die module 104 includes a die. A "die," as used in this disclosure, is an object that may be made from a variety of materials such as plastic and/or metal, and may contain a hardened surface on the inside, to press against a wire without deforming the wire. A die is configured to accept a wire and imprint the wire onto an electrical plug. In an embodiment, one or more wires that may be imprinted onto an electrical plug may be initially loaded onto a die. A die may be of a certain size and/or shape. A die may contain a wire size identifier, which indicates which wire size a die is configured to accept and imprint onto an electrical plug. In an embodiment, a die may contain a wire size identifier such as a color code which matches a Standard Romex™ Cable jacket color, as produced by Southwire Company, LLC of Carrollton Georgia, to denote which wire size a die may work with and to avoid possible mix ups. In an embodiment, a die may be able to accommodate one or more types of wire and/or one or more wire sizes and/or wire gauges. A die may include a side die, that is embedded within an inner sidewall located within inner compartment of module housing 108. A die may include a front die, that may be front facing, and located at front side of module housing 108. In an embodiment, a front die may be imbedded within a front side of a coil sliding body feature, as described below in more detail. In an embodiment, a side die may be of a specified size and shape, while a front die may be of a specified size and shape.

With continued reference to FIG. 1, module housing 108 includes an aperture configured to interface with a die. An "aperture," as used in this disclosure, is a groove that surrounds a die. In an embodiment, an aperture may be able to accommodate various sized die, such as a side die that may be of a first size and shape, and a front die that may be of a second side and shape. In an embodiment, inner compartment may contain a plurality of apertures, configured to surround a plurality of dies. In an embodiment, an aperture may contain one or more sub-grooves that may contain an additional slot and/or demarcation that may allow an aperture to accommodate various size die.

With continued reference to FIG. 1, inner compartment includes a coil sliding body feature, the coil sliding body feature configured to interface with an electrical plug. Coil sliding body feature may be configured to move back and forth within wire forming die module 104, to aid in imprinting a wire onto an electrical plug. Coil sliding body feature may move, using stored energy contained within a spring. Spring may include any of the springs as described above in more detail. Coil sliding body feature may be supported within inner compartment of module housing 108 by a sliding feature support object. Sliding feature support object may include one or more support components, such as a spring, washer, and/or support screw. Sliding feature support object may include a fastener, such as for example a drywall screw, eye screw, threaded fastener, carriage bolt, rivet, threaded rod, lag bolt, lag screw, mirror screw, sheet metal screw, twinfast screw, wood screw, security head screw, cap screw, carriage bolt, elevator bolt, eye bolt, hex cap screw, hex bolt, fine adjustment screw, machine screw, plow bolt, self-drilling screw, self-tapping machine screw, set bolt, set screw, shoulder bolt, shoulder screw, stove bolt, tension control bolt, thread rolling screws, superbolt, bone screws and the like. Fastener may include a built-in washer, may be fitted, or tapered, or non-tapered shank. Fastener may be mounted in place and stabilized with a plate. Fastener may be made of material such as steel, stainless steel, brass, titanium, bronze, silicon bronze, plastic, aluminum, nylon, and/or Monel.

With continued reference to FIG. 1, wire forming die module 104 includes a locking feature 112. Locking feature 112 may be secured to module housing 108 by a cover 116 for locking feature. Locking feature 112 may aid in securing wire forming die module 104 to electrical connection forming tool 100. In an embodiment, when locking feature 112 is engaged and in locked position, wire forming die module 104 may be attached to electrical connection forming tool 100. In an embodiment, when locking feature 112 is disengaged and in open position, wire forming die module 104 may be detached from electrical connection forming tool 100. Cover 116 may contain one or more openings that may be configured to accommodate a fastener, screw, and/or bolt, to secure cover 116 to electrical connection forming tool 100. In an embodiment, one or more openings contained within cover 116 may be of a specified size and/or shape to accommodate a fastener, screw, and/or bolt.

With continued reference to FIG. 1, electrical connection forming tool 100 includes an actuator 120, including a first end and a second end. Actuator 120 is configured to force an electrical plug into an actuator housing positioned to interface a die. Actuator 120 generates linear force to press a wire onto an electrical plug. Actuator 120 converts energy into mechanical motion, to aid in pressing a connection between a wire onto an electrical plug. Actuator 120 may include a mechanical actuator 120, operated by a human subject. Actuator 120 may include an electrical actuator 120, operated by a rechargeable power source such as a battery and/or a motor. Actuator 120 may contain a specified range of motion. For example, actuator 120 may include a linear actuator, that converts energy into straight line motions. In yet another non-limiting example, actuator may include a rotatory actuator 120 that converts energy to provide rotary motion. An actuator may include, but is not limited to an electric linear actuator, an electric rotatory actuator, a fluid power linear actuator, a fluid power rotary actuator, a linear chain actuator, a manual linear actuator, a manual rotary actuator, and the like. Actuator 120 may include a pump action actuator. A pump action actuator may include a pressing piston installed on the first end of the actuator 120, and a return coil located on the second end. Return coil on second end may allow for electrical connection forming tool 100 to be user friendly, by providing a self-powered mechanism for a piston return stroke, which allows for a new electrical plug to be loaded within electrical connection forming tool 100. Pump action actuator may be operated by a human subject, who may manually squeeze pressing piston to generate linear force. Actuator 120 is configured to force an electrical plug into an actuator housing 124 positioned to interface a die.

With continued reference to FIG. 1, electrical connection forming tool 100 includes an actuator housing 124. Actuator housing 124 connects wire forming die module 104 with actuator 120. Actuator housing 124 includes an opening configured to communicate with a die. Actuator housing 124 provides a chamber for force from an actuator 120 and/or pressing piston to travel, when generating force to push an electrical plug into wire forming die module 104 and against die. An "opening," as used in this disclosure, is a receptacle configured to accept an electrical plug. Opening may include an initial receptacle where an electrical plug is deposited, into electrical connection forming tool 100. Opening may aid in allowing an electrical plug to be safely introduced into electrical connection forming tool 100 for pressing. Actuator housing 124 includes an upper and a lower end. Actuator housing 124 may include a wire feed roller 128 located on upper end of actuator housing 124. A wire feed roller 128, may include a cylindrical body that may revolve on a fixed axis. In an embodiment, a wire feed roller 128 may be provided on each side of actuator housing 124 that faces a die and may act in a spring loaded fashion against a die when the die is loaded into electrical connection forming tool 100. A wire feed roller 128 may aid in pinning a wire into wire feed roller 128 to allow for smooth entry into wire forming die module 104 and proper alignment within electrical connection forming tool 100.

With continued reference to FIG. 1, actuator housing 124 may contain an alignment pop up feature. Alignment pop up feature may include a spring loaded alignment pop up feature, that aids in giving a loaded electrical plug the correct alignment for pressing. Alignment pop up feature also aids in preventing a loaded electrical plug within electrical connection forming tool 100 from falling out of actuator housing 124. Alignment pop up feature also aids in allowing one way entry of an electrical plug into opening. In an embodiment, actuator housing 124 is fixed to actuator 120, whereby actuator housing 124 is set in an absolute position, in relation to actuator 120. In an embodiment, actuator housing 124 is fixed to actuator 120, actuator housing 124 is set in a relative position, in relation to actuator 120. Actuator housing 124 may be fixed to actuator 120, such as by a fastener, or screw, including any as described herein. Actuator housing 124 may be fixed to actuator 120, such as by being welded together, manufactured from the same material, and/or 3D printed as one continuous component and the like.

With continued reference to FIG. 1, actuator housing 124 includes a structural chassis. A "structural chassis," as used in this disclosure, is a component of electrical connection forming tool 100 that provides rigidity and structural support. In an embodiment, a structural chassis may be composed of a material such as aluminum, which may aid in providing durable strength, lightweight properties, and corrosion resistance. In an embodiment, a structural chassis may be composed of one or more other materials, including but not limited to, magnesium, titanium, beryllium, iron, copper, and the like. Structural chassis may contain one or more holes, cut-outs, and/or other features that facilitate integration of structural chassis into electrical connection forming tool 100 with use of screws, fasteners, nuts, bolts, and the like. In an embodiment, electrical connection forming tool 100 may include two structural chassis, whereby each structural chassis may sandwich actuator housing 124. In an embodiment, a structural chassis may be integrated into actuator housing 124. In an embodiment, a structural chassis may be a separate component from actuator housing 124.

Figure 2:
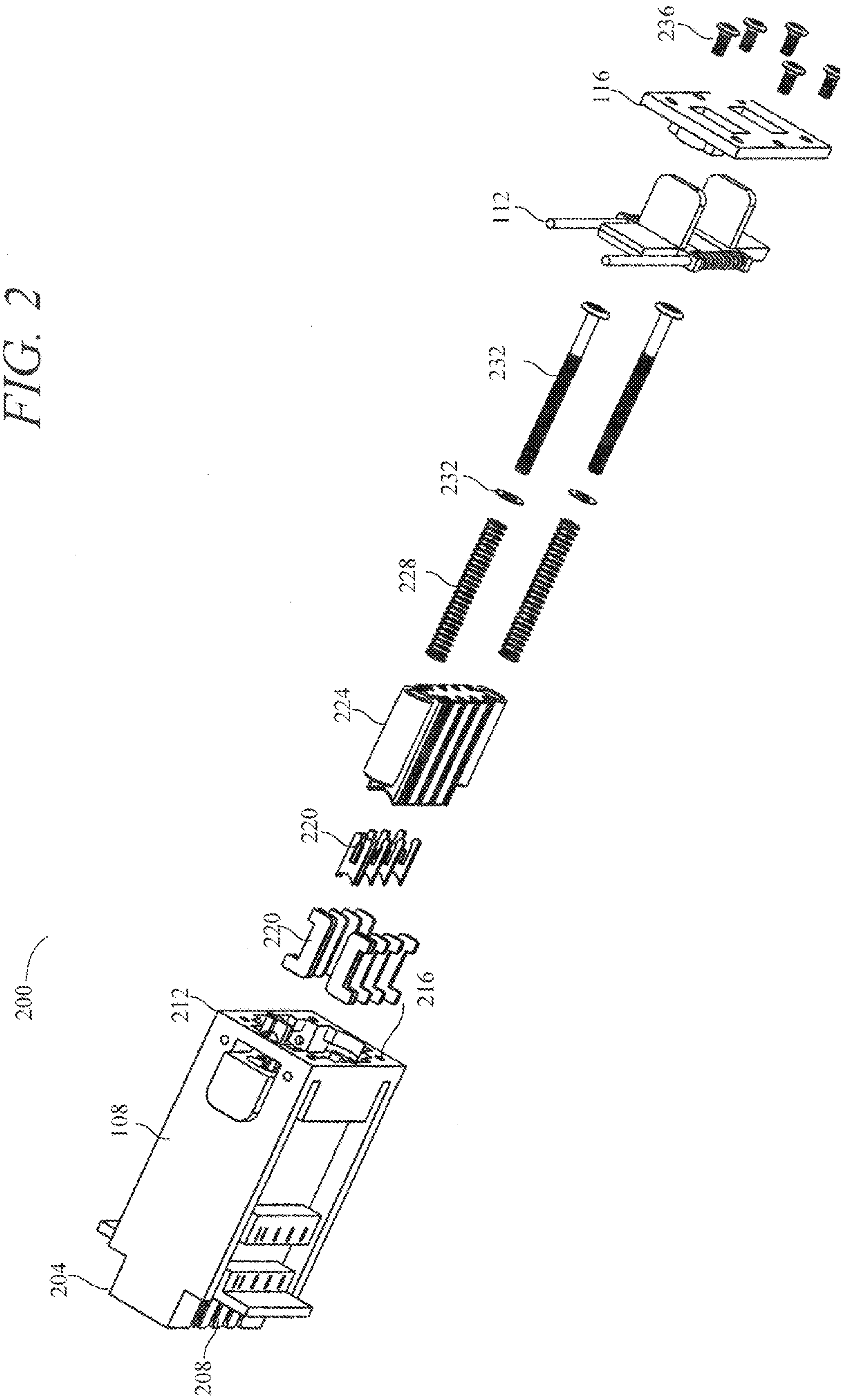
FIG. 2 is a schematic diagram illustrating an exemplary embodiment of components of wire forming die module.

Referring now to FIG. 2, an exemplary embodiment 200 of components of wire forming die module is illustrated. Wire forming die module 104 includes module housing 108, which includes a front side 204, the front side 204 including a chamber 208 configured to align with an electrical plug. Chamber 208 may include a barrel containing space of a certain length, width, and/or depth to accommodate an electrical plug. Chamber 208 may include a groove configured to aid in aligning an electrical plug within chamber 208 and to interface a die. Wire forming die module 104 includes a back side 212, and an inner compartment 216. Inner compartment 216 may house die 220 and/or coil sliding body feature 224. Die 220 is configured to shape and push one or more wires into one or more grooves located on the surface of a plug. Die 220 may be of various size, shape, and/or configuration. When an electrical plug interfaces die 220, one or more electrical wires and/or conductors may be imprinted onto a groove, located on the surface of an electrical plug. Die 220 may be composed of one or more materials, including for example plastic, metal, and/or any combination thereof. Die 220 may have a hardened surface on the inside, to aid in pressing a wire against an electrical plug, without deforming. Die 220 may be loaded into wire forming die module 104 using coil sliding body feature 224. Coil sliding body feature 224 may be configured to interface with an electrical plug. Coil sliding body feature 224 may contain a frictional movement within module housing 108, that may be aided by coil 228, allowing for coil sliding body feature 224 to move back and forth within module housing 108. Coil sliding body feature 224 may be configured to eject an electrical plug from electrical connection forming tool 100. For instance and without limitation, coil sliding body feature 224 may be used to eject an electrical plug containing an imprinted wire on the electrical plug from electrical connection forming tool 100. Coil 228 may include a spring, including any of the springs as described above in more detail in reference to FIG. 1. Coil 228 may store mechanical energy, and aid in moving coil sliding body feature 224. Coil sliding body feature includes a sliding feature support object 232, which may include a washer, screw, bolt, and the like to aid in supporting coil 228 within wire forming die module 104. In an embodiment, sliding feature support object 232 may include a screw and bolt that may aid in securing coil 228 within coil sliding body feature 224. Wire forming die module 104 includes locking feature 112, and a cover 116 for locking feature. In an embodiment, locking feature 112, and/or cover 116 for locking feature may be secured to module housing 108 with one or more screws 236. Screw 236 may aid in securing one or more components of wire forming die module 104 together.

Figure 3:
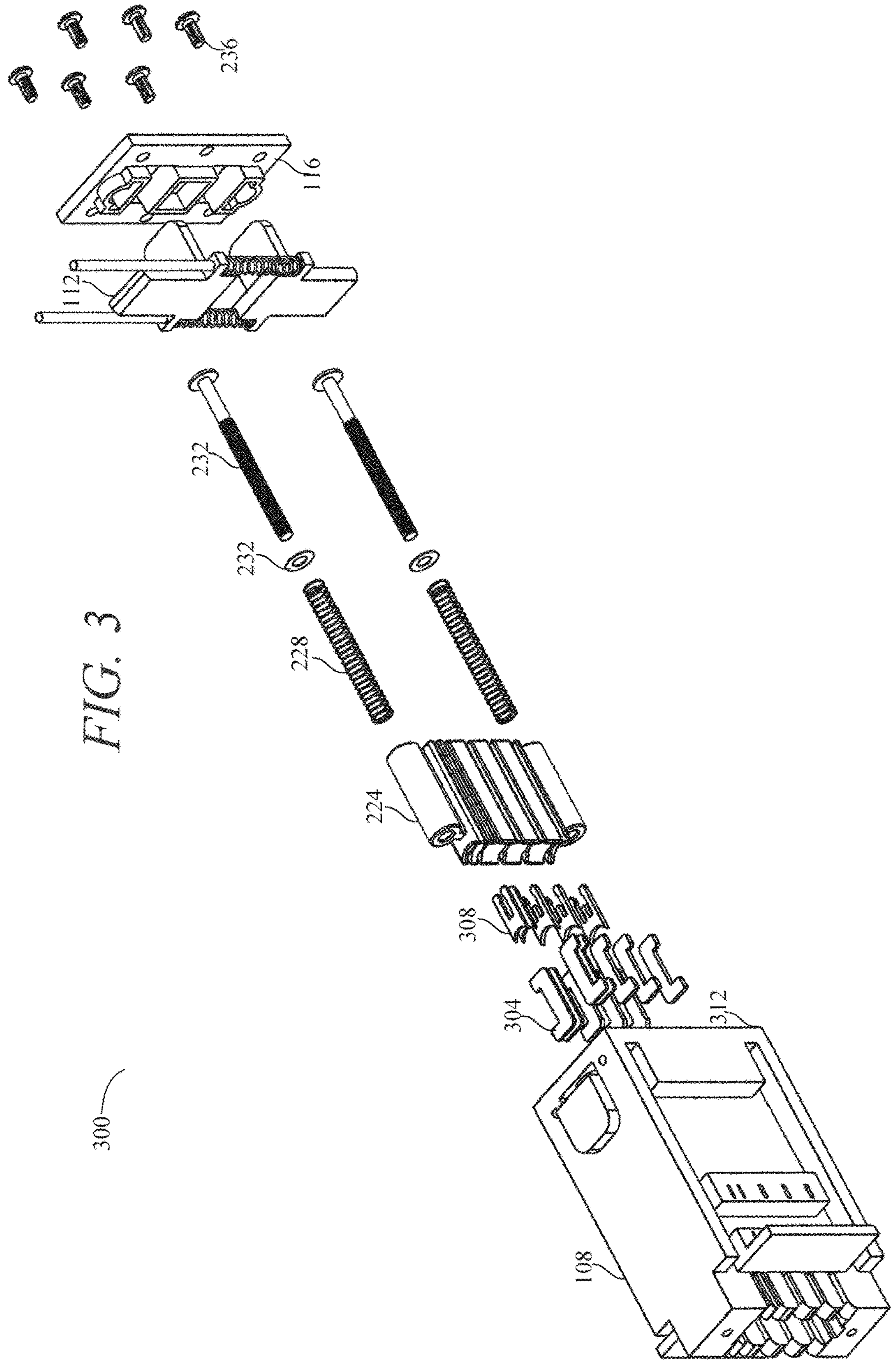
FIG. 3 is a schematic diagram illustrating an exemplary embodiment of a side view of wire forming die module.

Referring now to FIG. 3, an exemplary embodiment 300 of a side view of wire forming die module is illustrated. In an embodiment, die 220 may include a side die 304, and/or a front die 308. Side die 304 may imbed into inner sidewalls of module housing 108. In an embodiment, side die 304 that may be positioned within inner compartment 216. In an embodiment, front die 308 may imbed into front of coil sliding body feature 224. In an embodiment, side die 304 and/or front die 308 may be of a specified size and/or shape. For instance and without limitation, side die 304 may be larger in size and may have a first shape, while front die 308 may be smaller in size and have a second shape. Module housing 108 may contain an aperture 312 configured to interface with die 220, including for example side die 304 and/or front die 308. Aperture 312 may be of a specified size and shape to accommodate a die of varying size. Aperture 312 provides a securing means for securing die 220 within inner compartment 216. Aperture 312 may include a depression that may attach to and receive die 220. Aperture 312 interfaces die 220 within inner compartment 216 of module housing 108. Aperture 312 may be configured to accommodate die 220 of varying size, such as for example side die 304 and/or front die 308.

Figure 4:
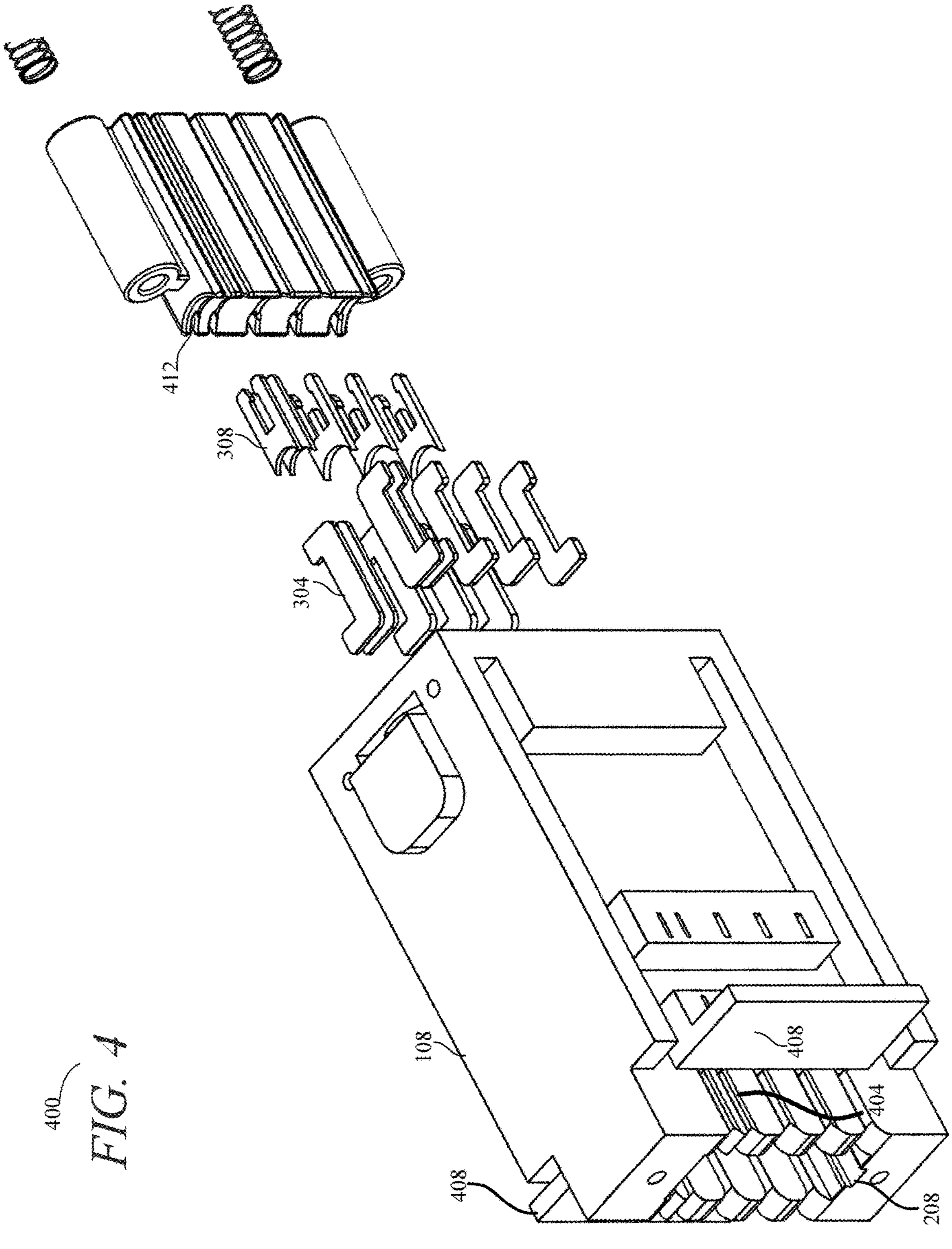
FIG. 4 is a schematic diagram illustrating an exemplary embodiment of module housing.

Referring now to FIG. 4, an exemplary embodiment 400 of module housing is illustrated. Module housing 108 includes chamber 208 configured to align with an electrical plug. In an embodiment, chamber 208 may include includes wire arrangement fingers 404. Wire arrangement fingers 404 may contain one or more channels, configured to house a wire. In an embodiment, a wire arrangement finger 404 may be of a certain size and/or shape to accommodate an electrically conductive wire and/or a communication wire. Wire arrangement finger 404 may aid in organizing one or more wires in parallel sets for pressing onto an electrical plug. In an embodiment, chamber 208 may include a wire loading platform 408 located on either side of wire arrangement fingers, which may aid in receiving an electrical plug and/or side die 220. In an embodiment, coil sliding body feature 224 may contain a slot 412 which may be configured to receive front die 308. Slot 412 may be of a size and/or shape configured to accept front die 308.

Figure 5:
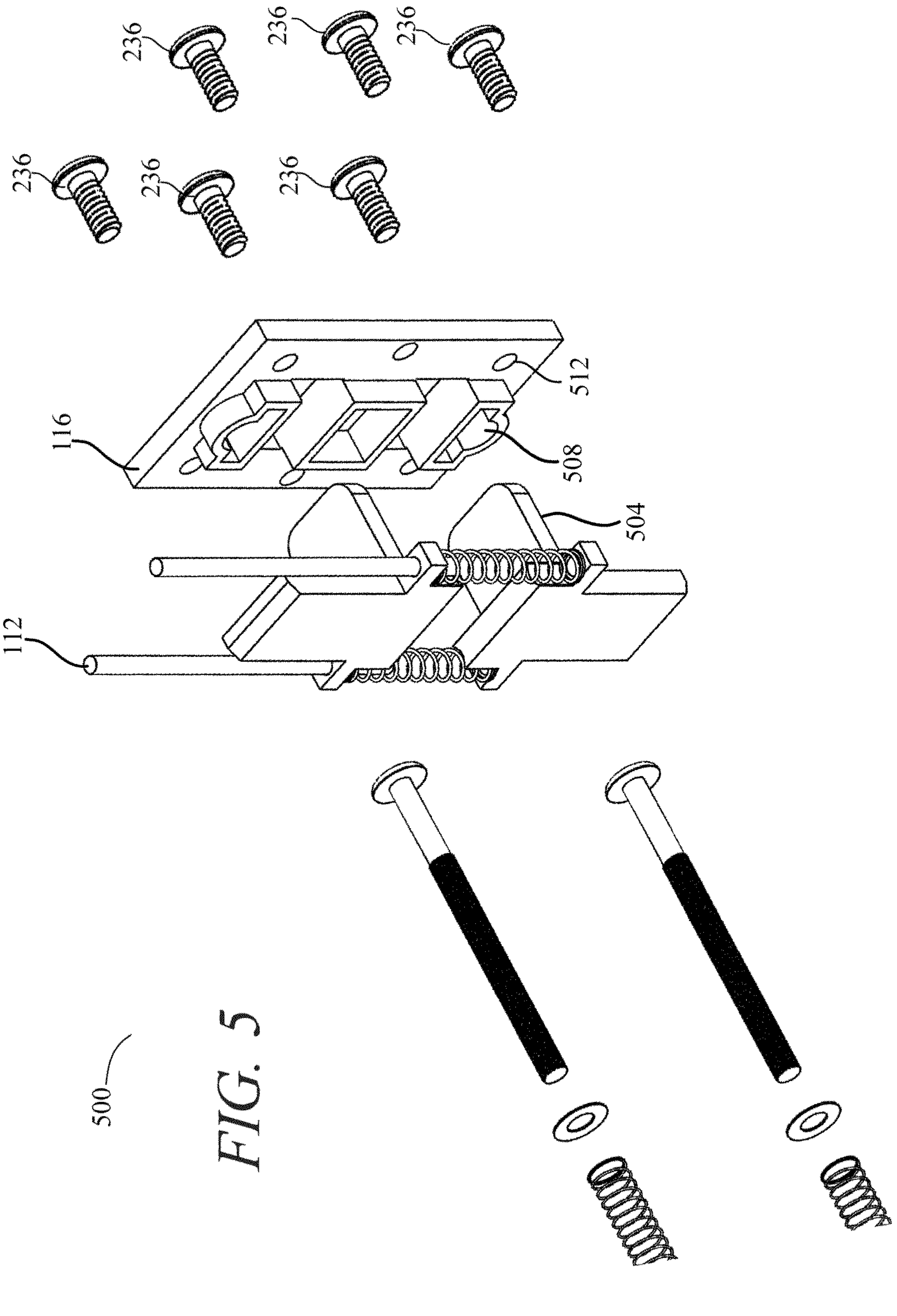
FIG. 5 is a schematic diagram illustrating an exemplary embodiment of locking feature.

Referring now to FIG. 5, an exemplary embodiment 500 of locking feature is illustrated. Locking feature 112 may aid in locking wire forming die module 104 onto electrical connection forming tool 100. Locking feature 112 may help in allowing for wire forming die module 104 to be detachable from electrical connection forming tool 100. This may allow for die 220 of various size and/or shape to be locked and loaded within wire forming die module 104. Locking feature 112 may contain a protrusion 504, that may be configured to fit within a receptacle 508 located on cover 116 of locking feature 112. In an embodiment, protrusion 504 may be secured by a human being, and set in place. Cover 116 for locking feature may be secured by one or more screws 236. In an embodiment, cover 116 for locking feature may contain a screw hole 512, configured to house and/or secure a screw 236.

Figure 6:
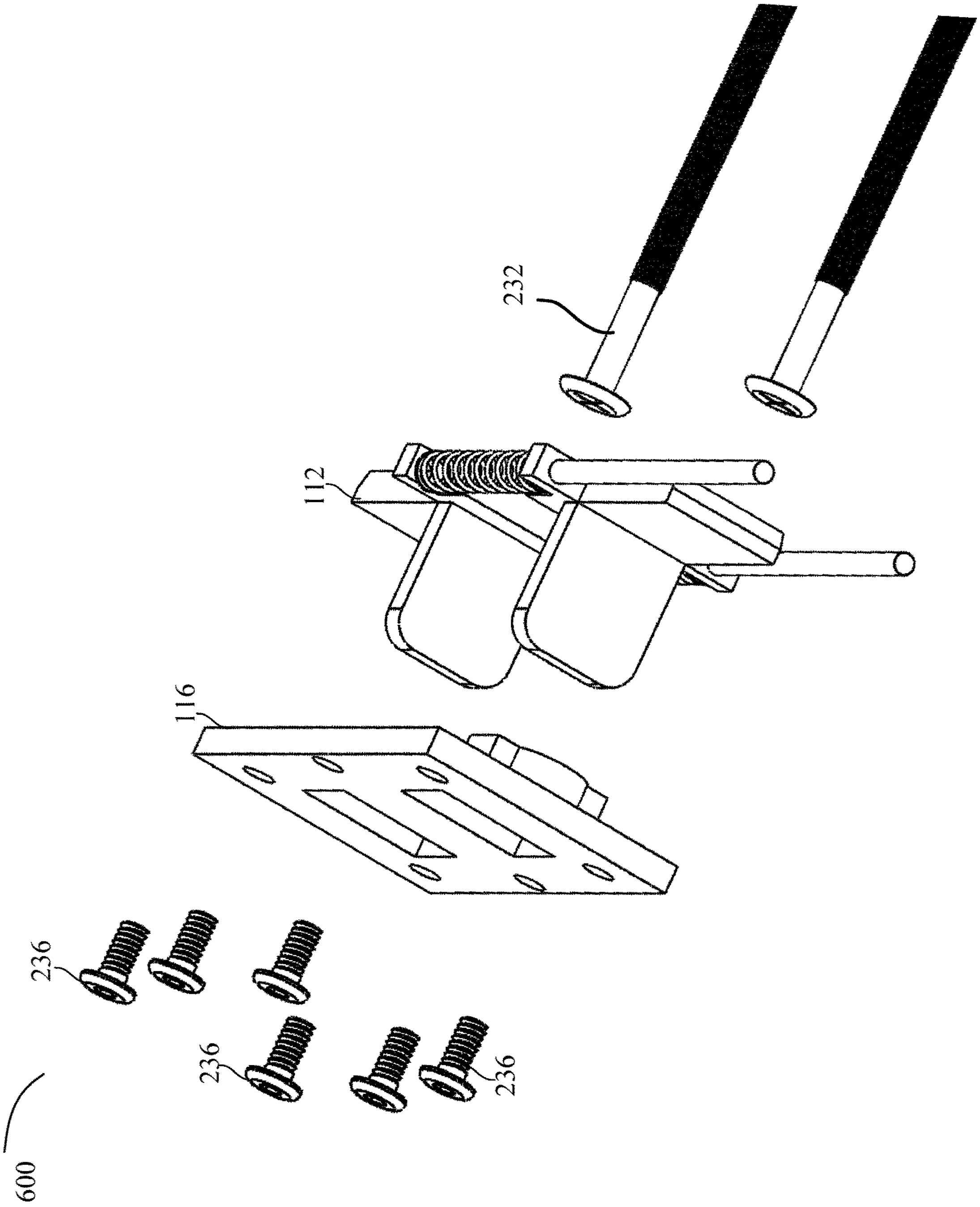
FIG. 6 is a schematic diagram illustrating an exemplary embodiment of locking feature.

Referring now to FIG. 6, an exemplary embodiment 600 of locking feature is illustrated. Locking feature 112 may aid in integration and alignment of locking wire forming die module 104 onto actuator housing 124. Locking feature 112 may aid in detaching wire forming die module 104 from actuator housing 124, so that various die 220 and/or wires may be loaded within wire forming die module 104. Die 220 may contain a wire size identifier, indicating what size and/or types of wires a die 220 is configured to imprint onto an electrical plug. In an embodiment, when locking feature 112 is engaged, wire forming die module 104 may be attached to electrical connection forming tool 100. In an embodiment, when locking feature 112 is disengaged, wire forming die module 104 may be detached from electrical connection forming tool.

Figure 7:
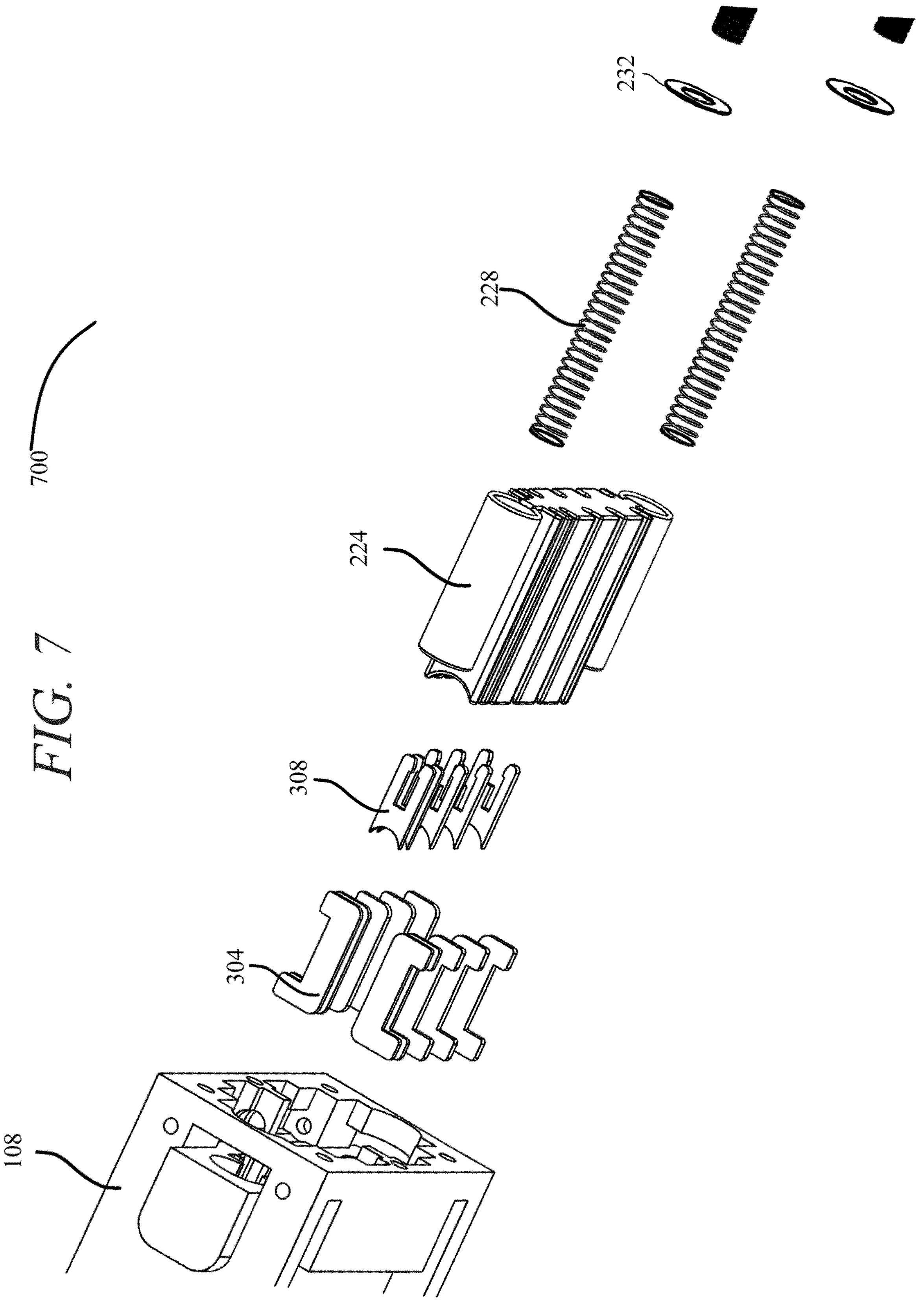
FIG. 7 is a schematic diagram illustrating an exemplary embodiment of wire forming die module.

Referring now to FIG. 7, an exemplary embodiment 700 of wire forming die module is illustrated. In an embodiment, compact nature of components of wire forming die module 104 allow side die 304 to imbed within sides of module housing 108. Compact nature of components of wire forming die module 104 allow front die 308 and/or coil 228 to imbed within coil sliding body feature 224.

Figure 8:
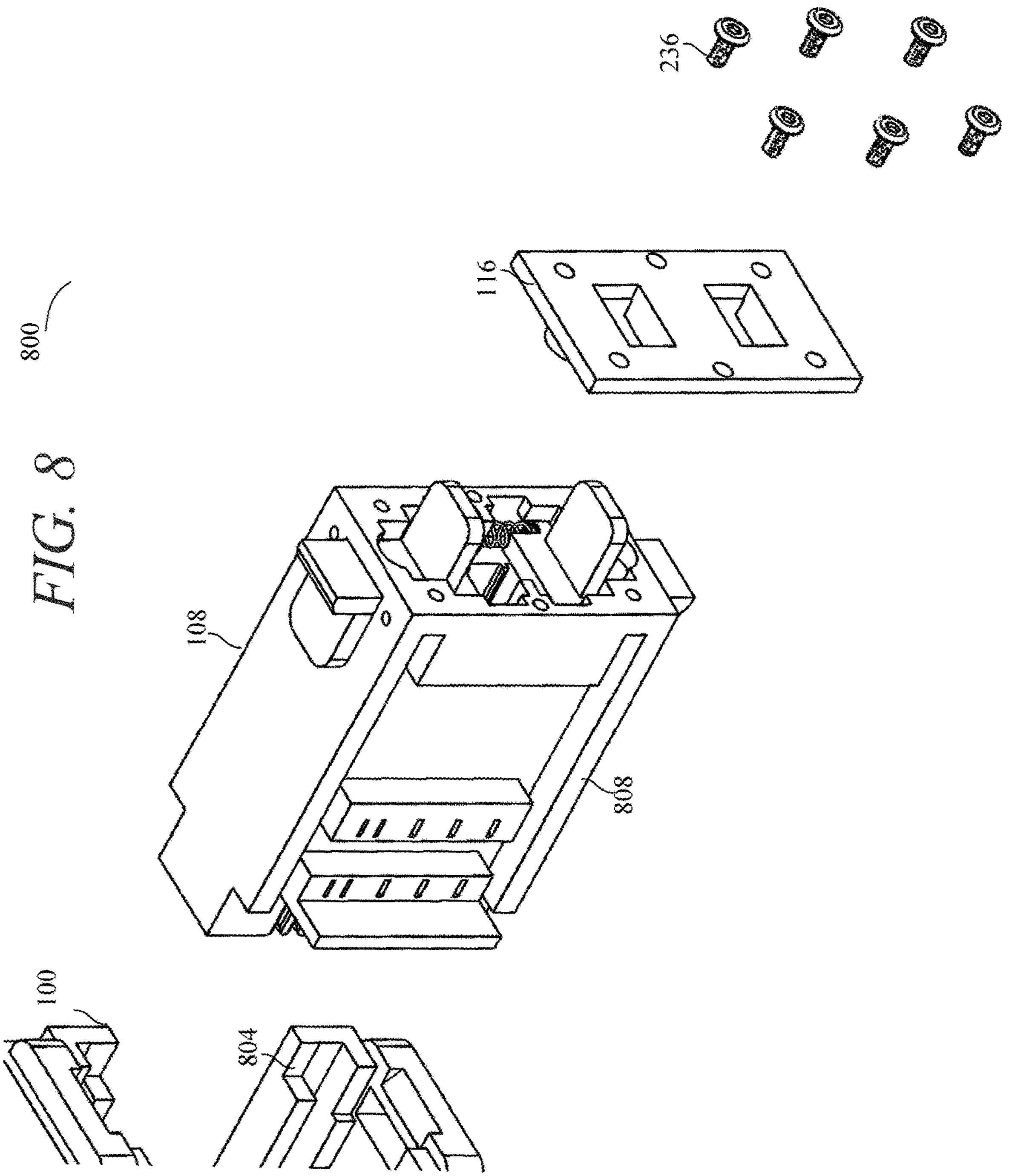
FIG. 8 is a schematic diagram illustrating an exemplary embodiment of a wire forming die module.

Referring now to FIG. 8, an exemplary embodiment 800 of a wire forming die module is illustrated. In an embodiment, compact nature of wire forming die module 104 is illustrated. One or more components of wire forming die module, such as die 220, coil sliding body feature 224, locking feature 112, and/or cover 116 for locking feature may be placed into module housing. In an embodiment, cover 116 for locking may be attached to module housing 108 using one or more screws 236. In such an instance, a fully assembled wire forming die module 104 may dock into electrical connection forming tool 100. In an embodiment, wire forming die module 104 may slide into a track 804, located on electrical connection forming tool 100, that may aid in accepting wire forming die module 104, and securing wire forming die module 104 in place. In an embodiment, wire forming die module 104 may contain a glider 808 that may aid in positioning wire forming die module 104 to align with track 804, and securing wire forming die module 104 to electrical connection forming tool 100. In an embodiment, wire forming die module 104 may attach to electrical connection forming tool 100 using an attachment feature such as a snapping feature, that may allow for wire forming die module 104 to attach to electrical connection forming tool 100.

Figure 9:
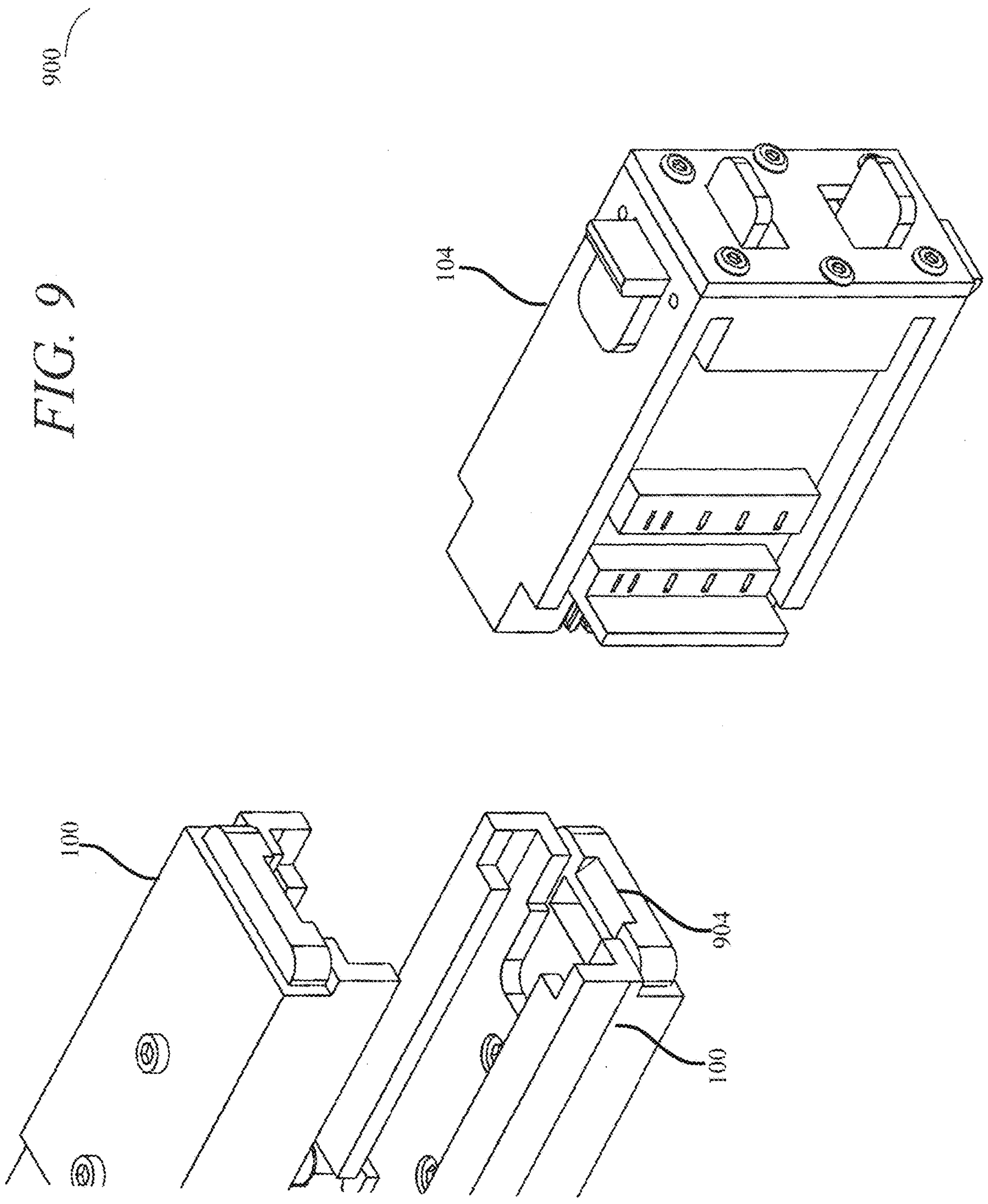
FIG. 9 is a schematic diagram illustrating an exemplary embodiment of assembled wire forming die module.

Referring now to FIG. 9, an exemplary embodiment 900 of assembled wire forming die module is illustrated. Assembled wire forming die module 104 indicates that all components of wire forming die module 104 have been compactly assembled together and are ready to be docked into electrical connection forming tool 100. Wire forming die module 104 is detachable from electrical connection forming tool 100, whereby wire forming die module 104 may accommodate wires of vary size and current capacity. Die 220 may contain a wire size identifier, specifying what size wire a die 220 can accommodate. In an embodiment, wire size identifier may contain a color code which matches a Standard Romex™ Cable jacket color, as produced by Southwire Company, LLC of Carrollton Ga. For instance and without limitation, wire size identifier located on die 220 may contain a yellow marking, indicating that die can accommodate No. 12 wire. In an embodiment, an assembled wire forming die module 104 is docked into electrical connection forming tool 100. Wire forming die module 104 may slide and clip into electrical connection forming tool 100, as described above in more detail. In an embodiment, electrical connection forming tool 100 may contain a groove 904, configured to aid wire forming die module 104 in docking to electrical connection forming tool 100.

Figure 10:
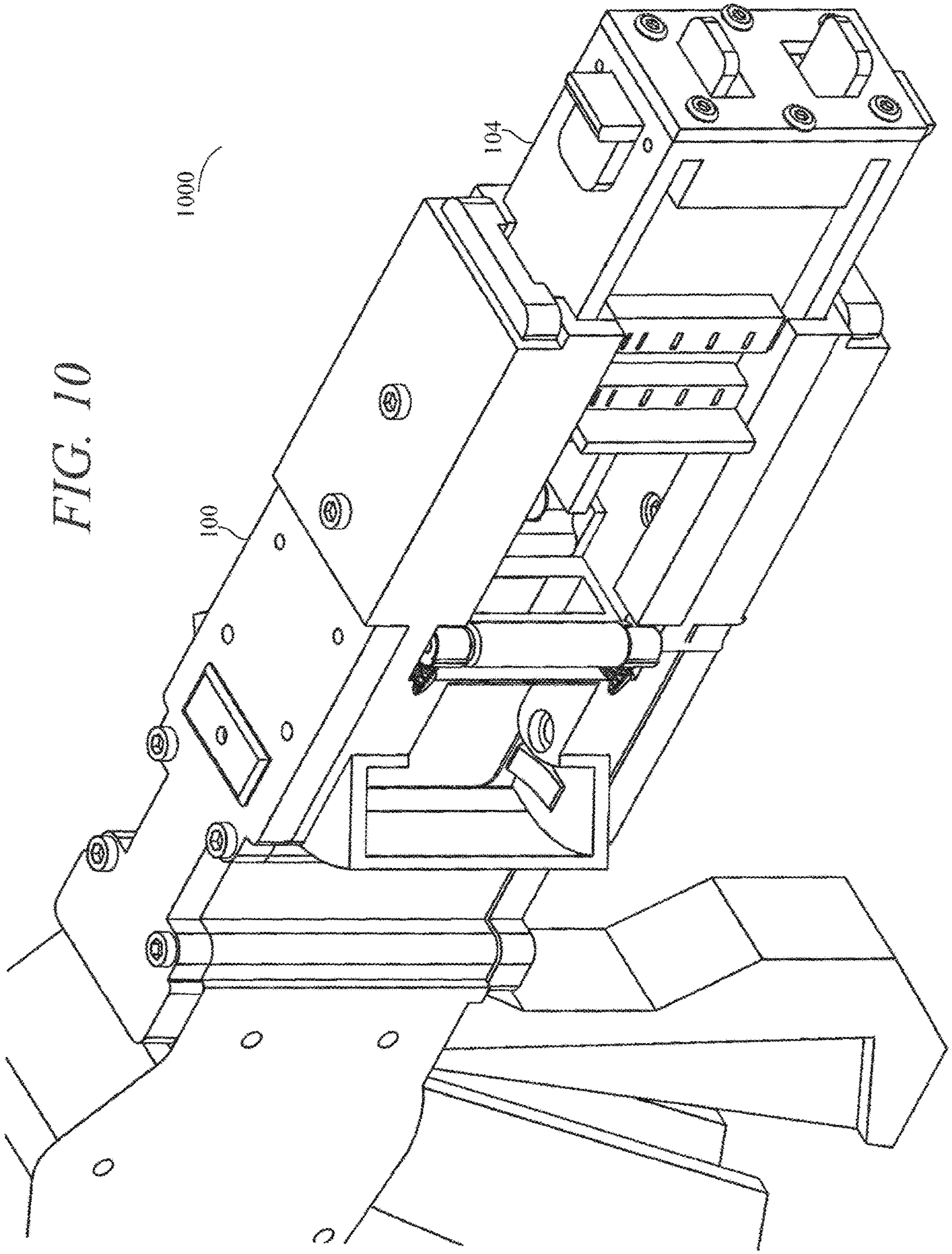
FIG. 10 is a schematic diagram illustrating an exemplary embodiment of a partially docked wire forming die module.

Referring now to FIG. 10, an exemplary embodiment 1000 of a partially docked wire forming die module is illustrated. Electrical connection forming tool 100 accepts wire forming die module 104 as it is inserted to interface with electrical connection forming tool 100. Wire forming die module 104 may be partially docked, when it is not fully loaded into electrical connection forming tool 100.

Figure 11:
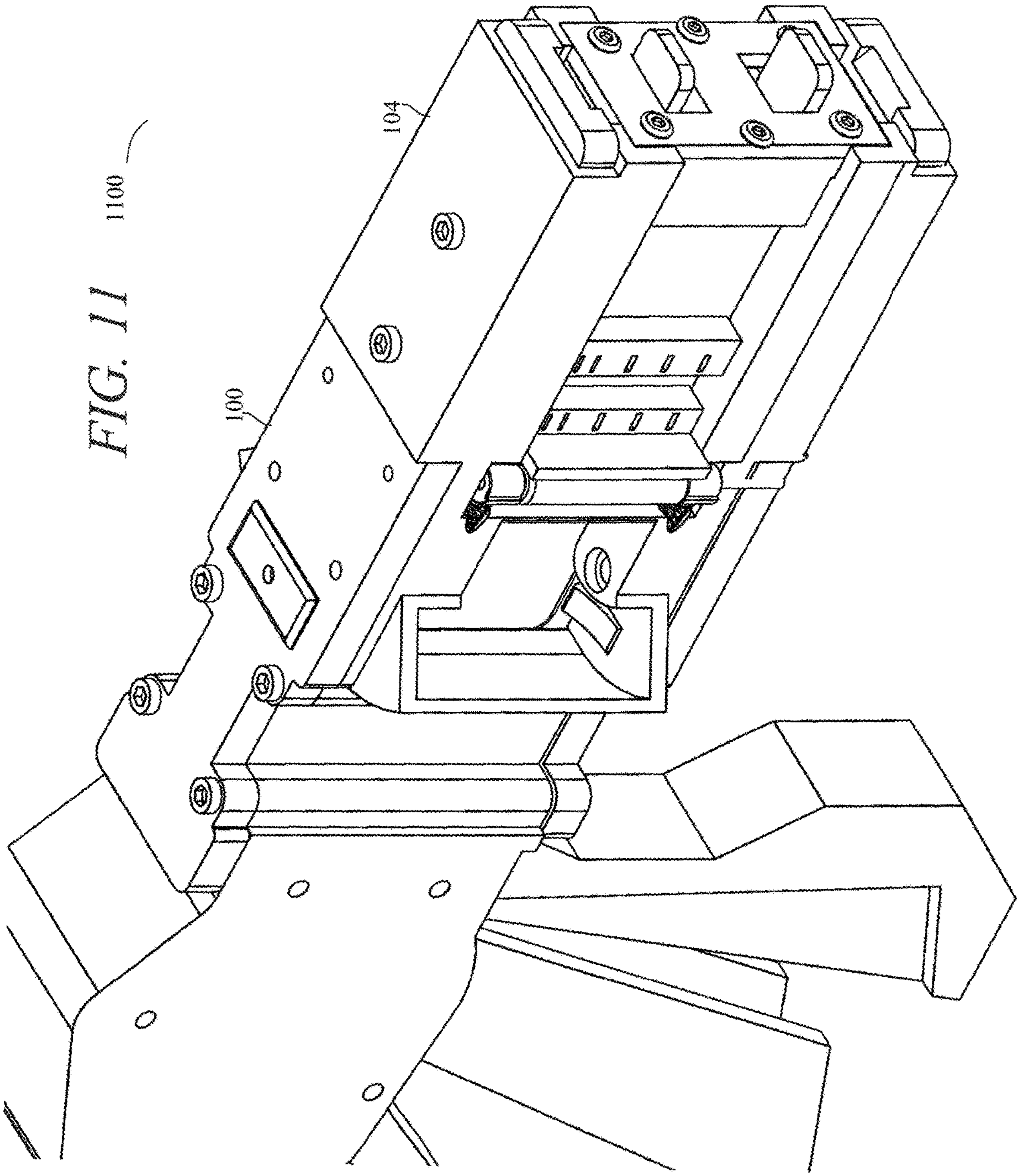
FIG. 11 is a schematic diagram illustrating an exemplary embodiment of a fully docked wire forming die module.

Referring now to FIG. 11, an exemplary embodiment 1100 of a fully docked wire forming die module is illustrated. Wire forming die module 104 may be fully docked, when it is completely loaded into electrical connection forming tool 100. Detachable component of wire forming die module 104, allows for wire forming die module 104 to attach and/or detach from electrical connection forming tool 100. In an embodiment, fully loaded wire forming die module 104 may create a continuous smooth connection between electrical connection forming tool 100 and wire forming die module 104.

Figure 12:
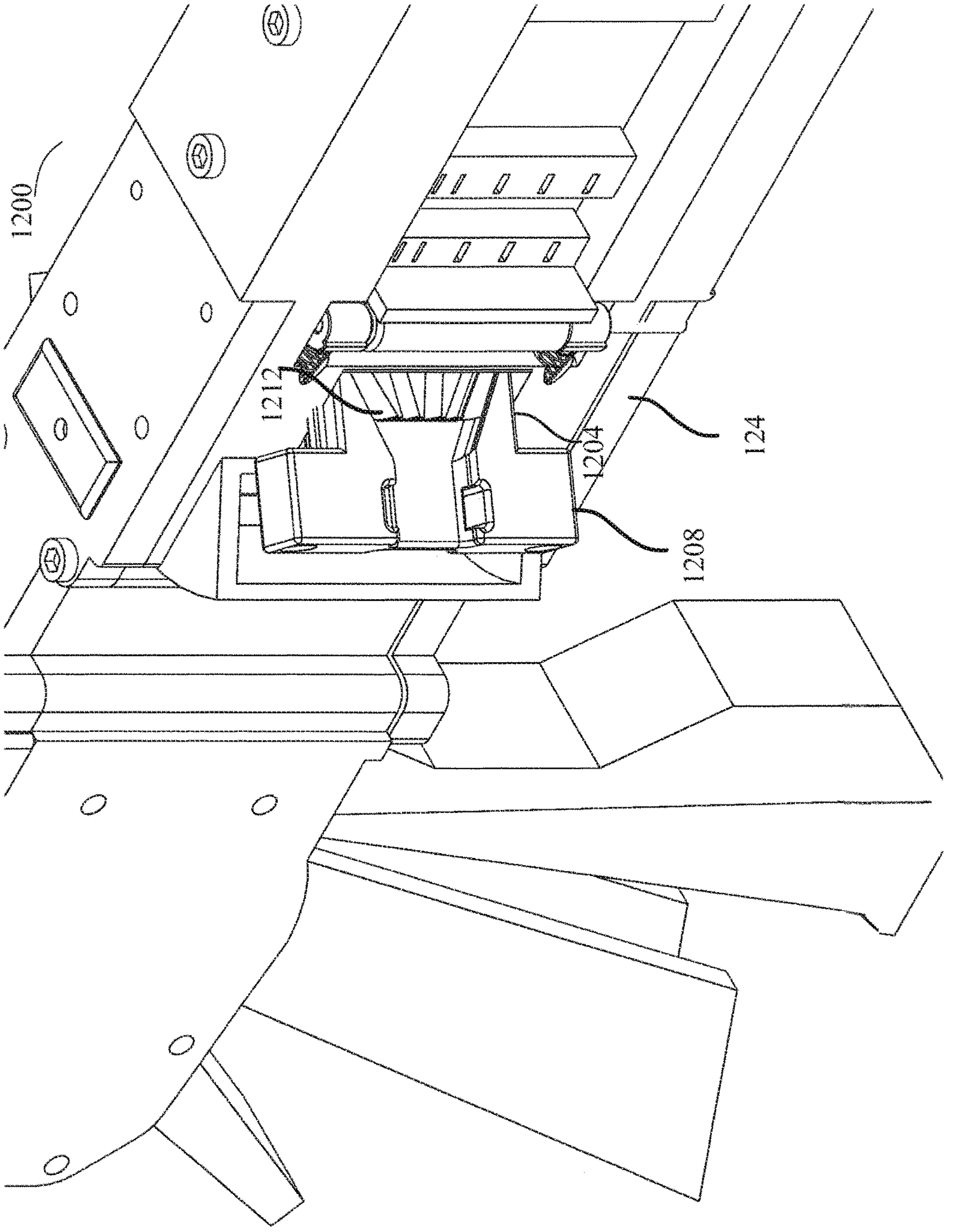
FIG. 12 is a schematic diagram illustrating an exemplary embodiment of an electrical plug entering an opening.

Referring now to FIG. 12, an exemplary embodiment 1200 of an electrical plug entering an opening is illustrated. Actuator housing 124 includes an opening 1204 configured to communicate with a die 220 and chamber 208 located within module housing 108. An electrical plug 1208 may be loaded into opening 1204, whereby electrical plug 1208 may interface with chamber 208. In an embodiment, an electrical plug 1208 may contain one or more channels 1212, designed and configured to house a wire on the electrical plug 1208. In an embodiment, insertion of an electrical plug into a receptacle after a wire has been pressed onto the electrical plug by electrical connection forming tool 100, may cause the wire in the channel 1212 to come into electrical connection with a conductive element. In an embodiment, a channel 1212 located an electrical plug may be of a certain size and/or shape, to accommodate a particular wire, such as a power transmission wire, and/or a communication wire which may range in size, shape, and/or diameter.

Figure 13:
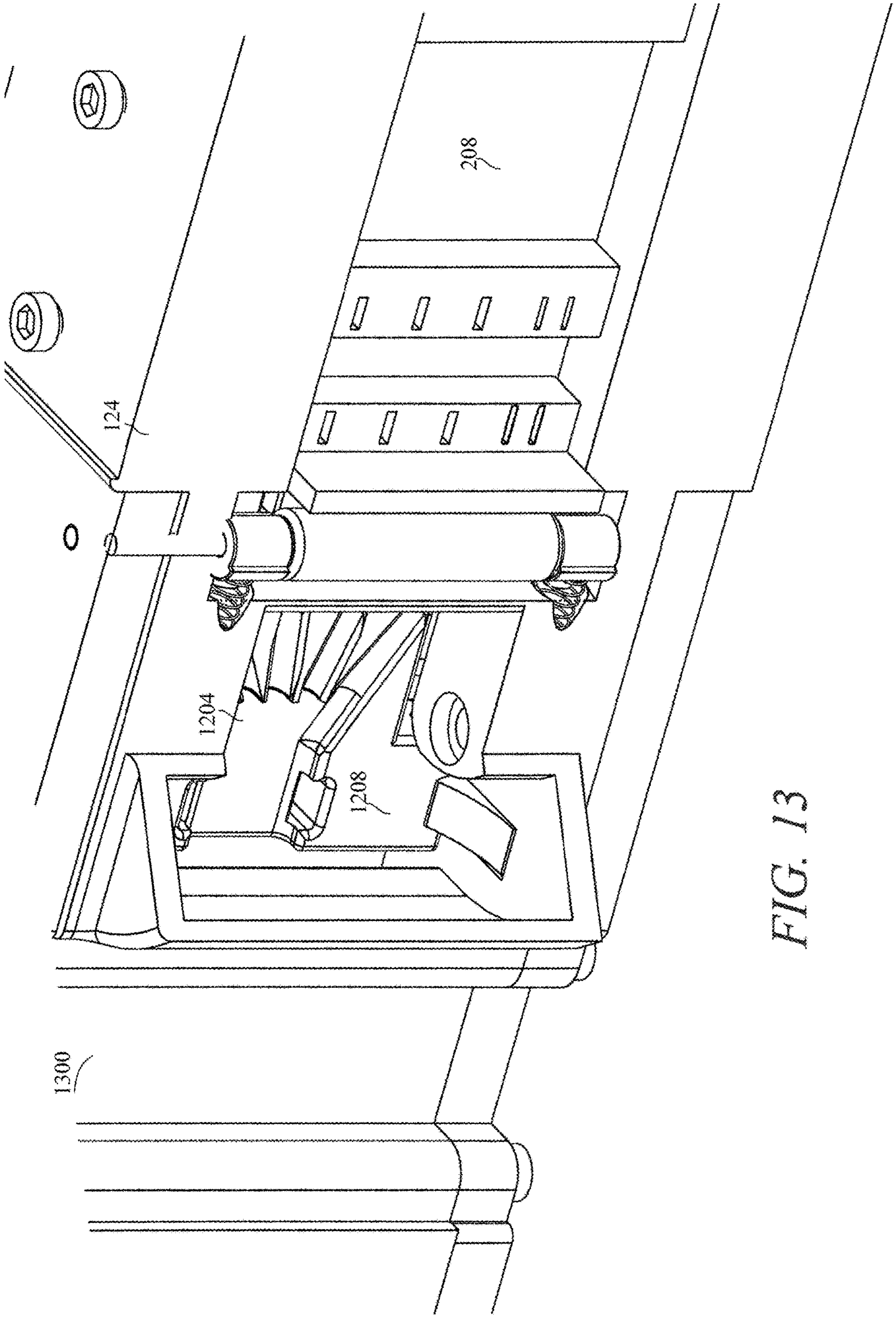
FIG. 13 is a schematic diagram illustrating an exemplary embodiment of an electrical plug loaded into an opening.

Referring now to FIG. 13, an exemplary embodiment 1300 of an electrical plug loaded into an opening is illustrated. In an embodiment, an electrical plug 1208 loaded into an opening 1204, may be forced into actuator housing 124 and into chamber 208 located within module housing 108, to interface with a die 220 by control of actuator 120. Actuator 120 may be powered by a human subject, and/or by a rechargeable power source such as a battery and/or a motor. For example, actuator 120 may include a pump action actuator, that is primed and pumped by a human subject, whereby the actuator 120 then forces an electrical plug into actuator housing 124 positioned to interface a die.

Figure 14:
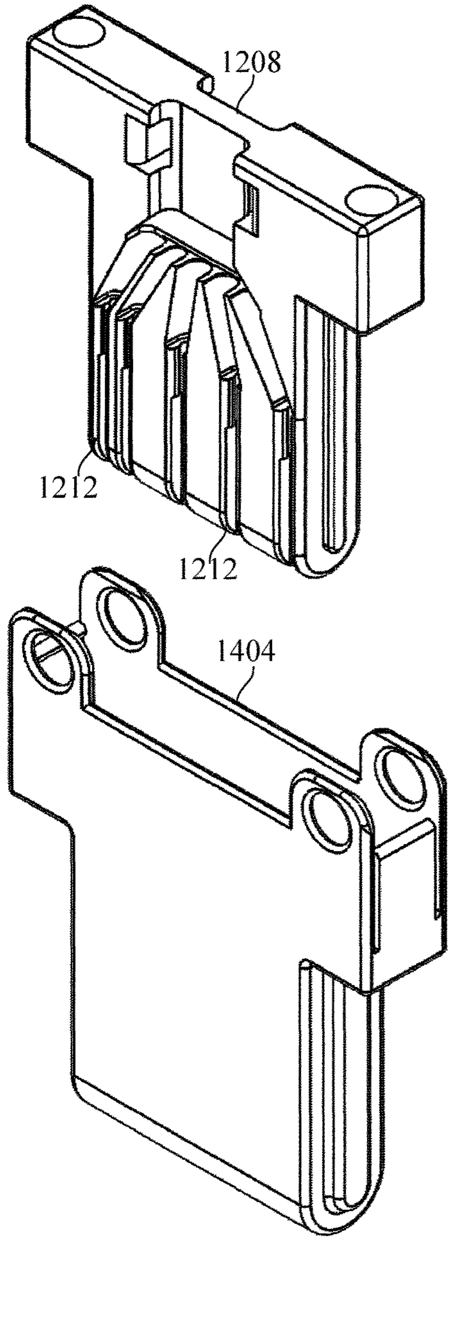
FIG. 14 is a schematic diagram illustrating an exemplary embodiment of an electrical plug lockout sheath.

Referring now to FIG. 14, an exemplary embodiment 1400 of an electrical plug lockout sheath is illustrated. In an embodiment, an electrical plug 1208 containing a wire imprinted from electrical connection forming tool 100, may be inserted into lockout sheath 1404. In an embodiment, a wire may be imprinted by electrical connection forming tool 100, onto channel 1212. Channel 1212 may be of a certain size, shape, and/or diameter, to accommodate various wires, as described above in more detail. Lockout sheath 1404 may enable a formed electrical plug 1208 containing one or more wires to be locked out and shut off. This may enable an electrical plug 1208 to be isolated and rendered inoperative, until it is ready to be installed in a structure. Lockout sheath 1208 may provide an additional safety feature, to help protect employees from potential injury and/or from unexpected energization or startup, or release of stored energy in an electrical plug 1208. Lockout sheath 1404 may aid in blocking out electrical activity of an electrical plug 1208. Once an electrical plug 1208 has been fully inserted into lockout sheath 1404, a lock may then be applied. In an embodiment, electrical plug 1208 may slide into lockout sheath 1404. Lockout sheath 1404 may be configured to accommodate an electrical plug 1208 of various size and/or shape.

Figure 15:
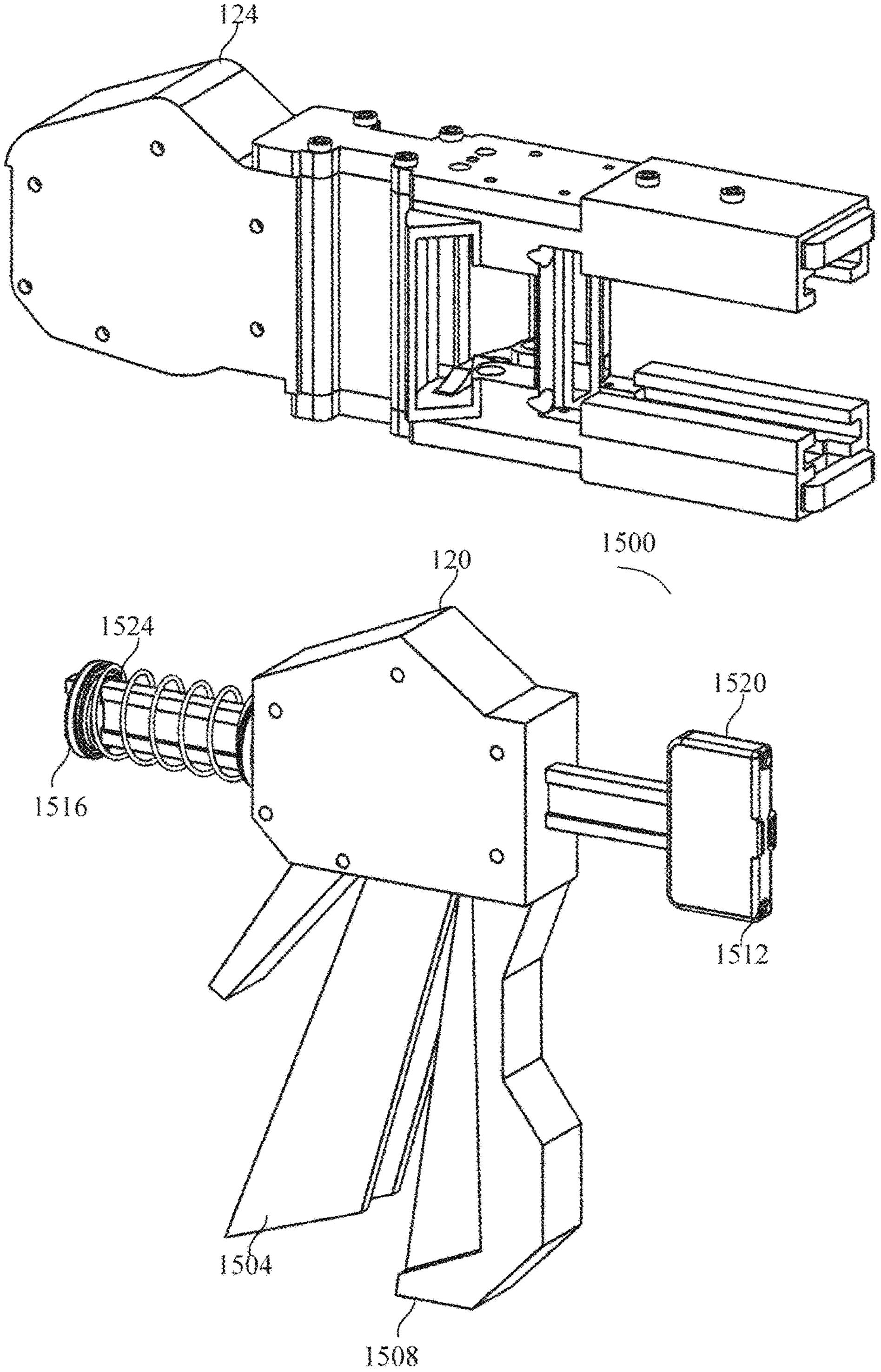
FIG. 15 is a schematic diagram illustrating an exemplary embodiment of a pump action actuator.

Referring now to FIG. 15, an exemplary embodiment 1500 of pump action actuator is illustrated. In an embodiment, actuator 120 may include a pump action actuator, that may aid in generating energy, to force an electrical plug 1208 into an actuator housing 124, positioned to interface a die 120. Pump action actuator may contain a handle 1504, whereby a human subject may squeeze a pump 1508 to generate energy to force an electrical plug 1208 into an actuator housing 124. Pump action actuator may include a first end 1512 and a second end 1516. In an embodiment, pump action actuator may be produced from a carpentry clamp that is reversed to function as a press. Actuator 120 may include a pressing piston 1520 located on the first end 1512. Pressing piston 1520 may include a moving component, whereby force is transferred from pumping action of pump 1508 to the pressing piston 1520, for the purpose of forcing an electrical plug 1208 into actuator housing 124 to interface die 220. In an embodiment, pressing piston 1520 may be of a cylindrical shape. In an embodiment, pressing piston 1520 may be of a rectangular shape. Pressing piston 1520 may be composed of one or more materials, including but not limited to aluminum, cast iron, and/or steel. Pump action actuator may include a return coil 1524 located on the second end 1516. Return coil 1524 may include a spring, including any of the springs as described above in more detail in reference to FIG. 1. Return coil 1524 may create a return system that provides a self-powered mechanism for a pressing piston return stroke, allowing chamber to open, and accept a new electrical plug 1208 to be loaded.

Figure 16:
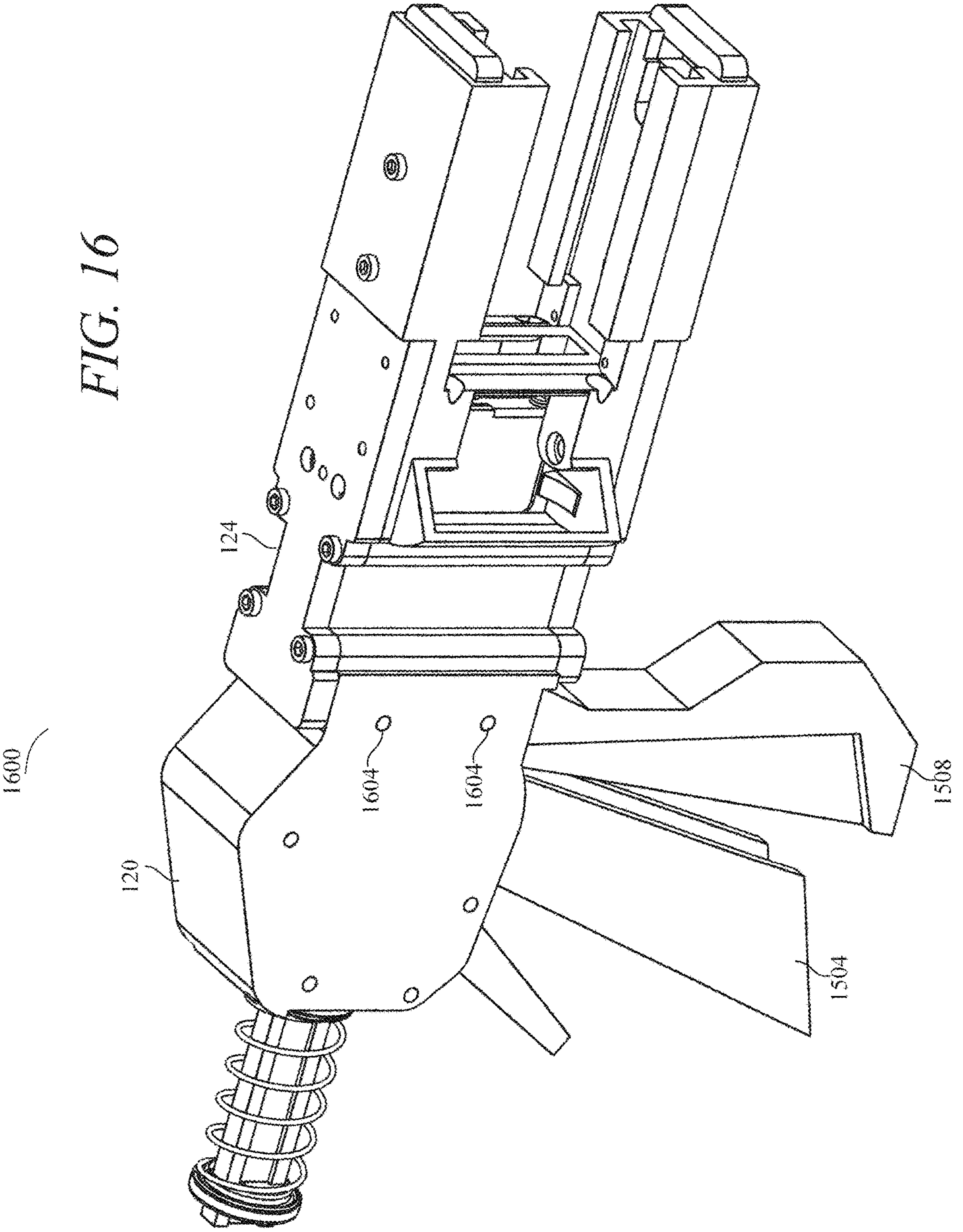
FIG. 16 is a schematic diagram illustrating an exemplary embodiment of an actuator contained within electrical connection forming tool.

Referring now to FIG. 16, an exemplary embodiment 1600 of an actuator contained within electrical connection forming tool 100 is illustrated. Actuator housing 124 connects actuator 120 to electrical connection forming tool 100, and also connects wire forming die module 104 to actuator 120. In an embodiment, actuator 120 and actuator housing 124 may be one uniform component of electrical connection forming tool 100. Actuator 120 and/or actuator housing 124 may connect to wire forming die module 104 using screws and/or any other connection methods. In an embodiment, actuator 120 may contain one or more holes 1604 configured to house a screw and/or any other connection mechanism such as a bolt, fastener, nail, pin, tack, spike, rivet, and the like. In an embodiment, actuator 120 may contain a handle 1504 and a pump 1508, configured to be operated by a human being, to generate force to push an electrical plug 1208 into actuator housing 124. In an embodiment, actuator 120 may be operated by an external power source, such as a battery and/or a motor.

Figure 17:
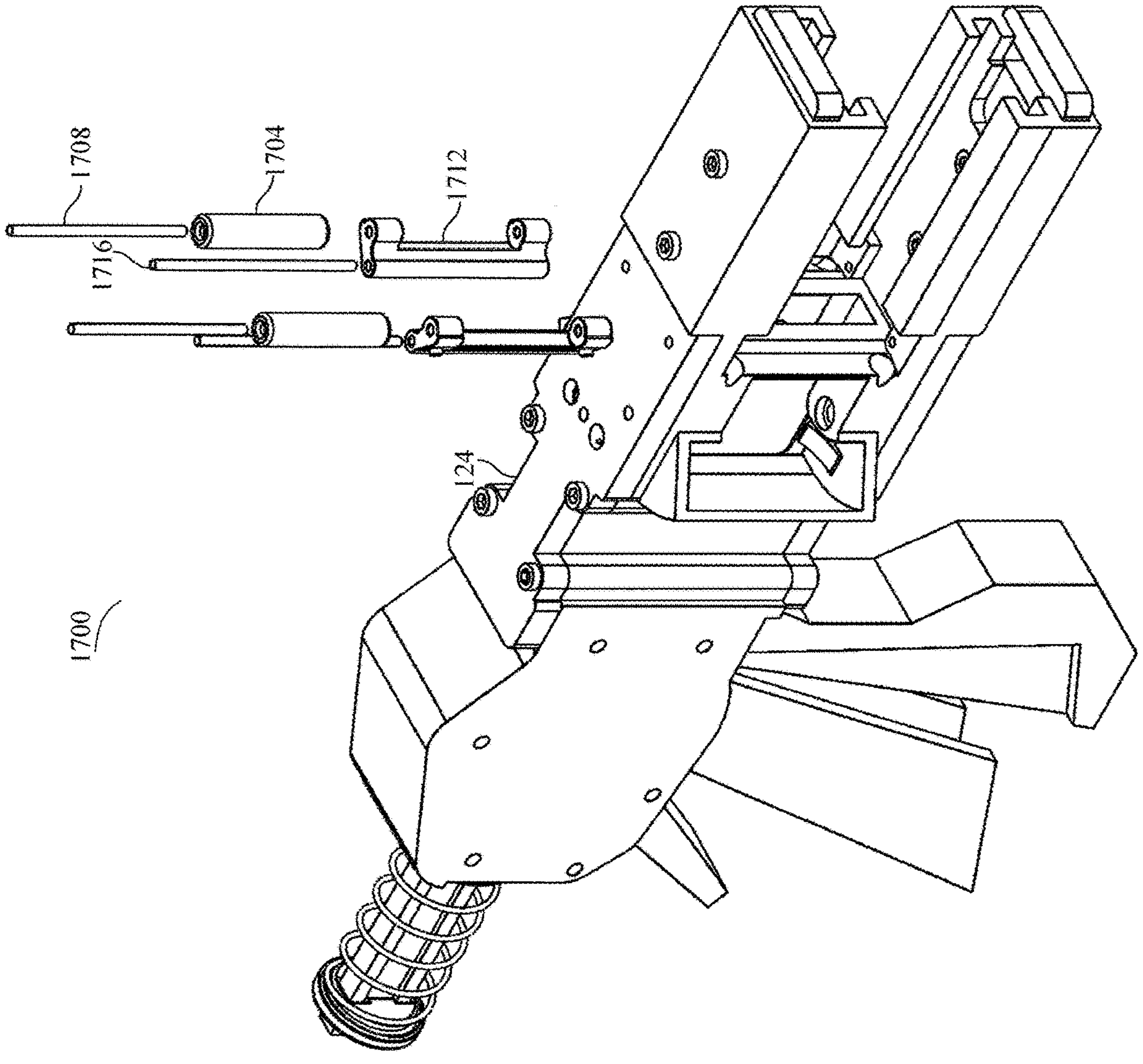
FIG. 17 is a schematic diagram illustrating an exemplary embodiment of wire feed roller components.

Referring now to FIG. 17, an exemplary embodiment 1700 of components of wire feed roller are illustrated. In an embodiment, actuator housing 124 may include a wire feed roller 128, configured to interface with wire forming die module 104. In an embodiment, wire feed roller 128 may include a cylindrical shaped roller 1704, that rotates around a central axis 1708. In an embodiment, wire feed roller 128 may rotate around a central axis 1708 such as a rod. In such an instance, a central axis 1708 such as a rod may be secured within a rod holder 1712, which may aid in providing stability and support for central axis and wire feed roller 128. Rod holder 1712 may contain one or more holes configured to secure in place central axis 1708, roller 1704, and/or an additional rod 1716. Wire feed roller 128 may aid in allowing for orderly entry of an electrical plug into wire forming die module 104 and/or opening located within actuator housing 124. Wire feed roller 128 may also aid in allowing for orderly entry of a wire, into electrical connection forming tool 100 and/or onto die 220.

Figure 18:
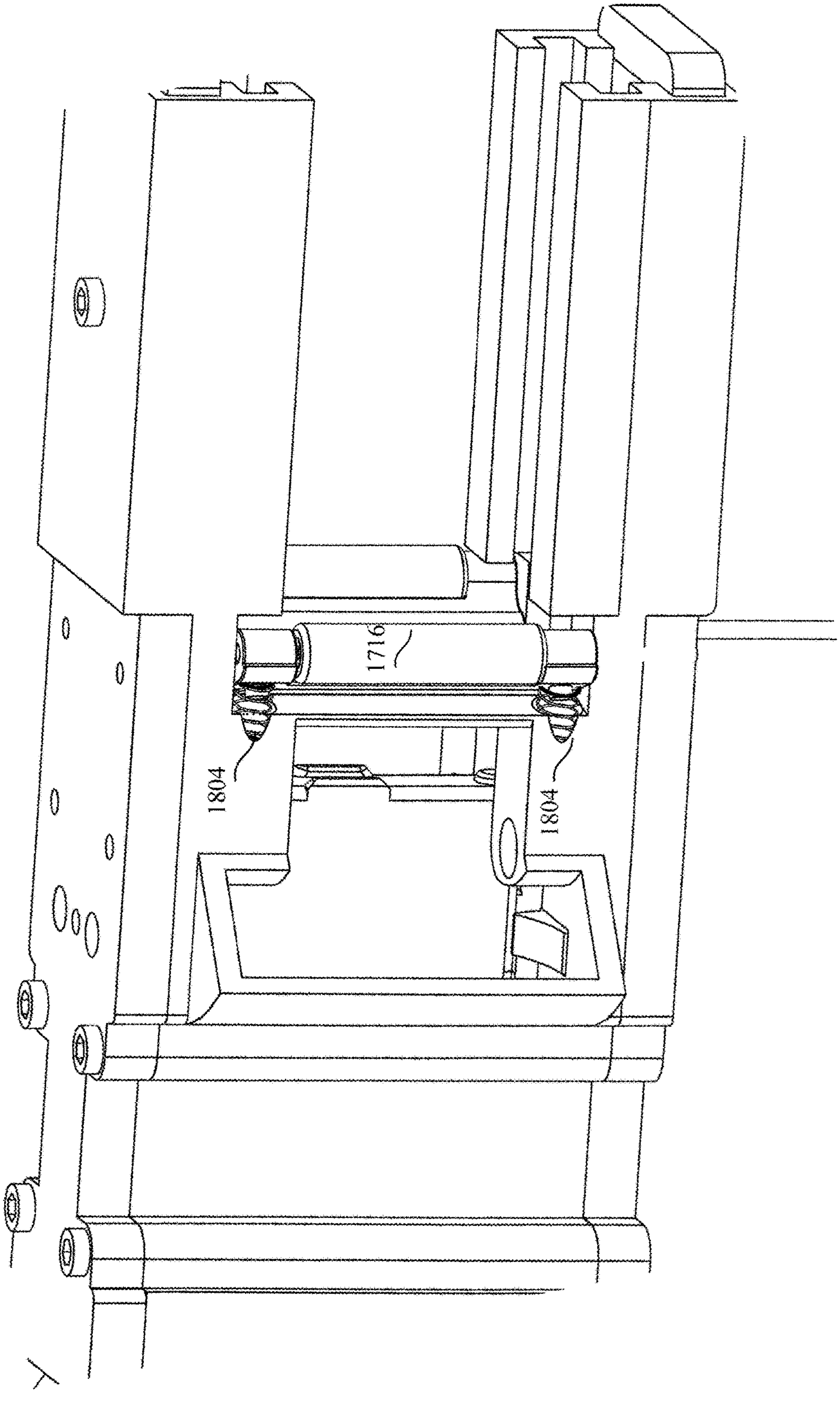
FIG. 18 is a schematic diagram illustrating an exemplary embodiment of an installed wire feed roller.

Referring now to FIG. 18, an exemplary embodiment 1800 of an installed wire feed roller is illustrated. In an embodiment, installed wire feed roller 128 may be secured to electrical connection forming tool 100 using a coil spring 1804, and/or any other connection mechanism, including any of the connection mechanisms as described above in more detail above. Coil spring 1804 may include any mechanical device that may be used to store energy and subsequently release it, to absorb shock, or to maintain a force between contacting surfaces. Coil spring 1804 may include a tension coil spring, an extension coil spring, a compression coil spring, a volute spring, and/or a torsion spring. Wire feed roller 128 may be secured to electrical connection forming tool 100 using rod 1716, as described above. In an embodiment, wire feed roller 128 may be secured to electrical connection forming tool 100 using a screw, including any of the screws as described herein. In an embodiment, rod holder 1712 may contain one or more holes configured to house a screw and/or any other connection mechanism, to secure wire feed roller 128 to electrical connection forming tool 100.

Figure 19:
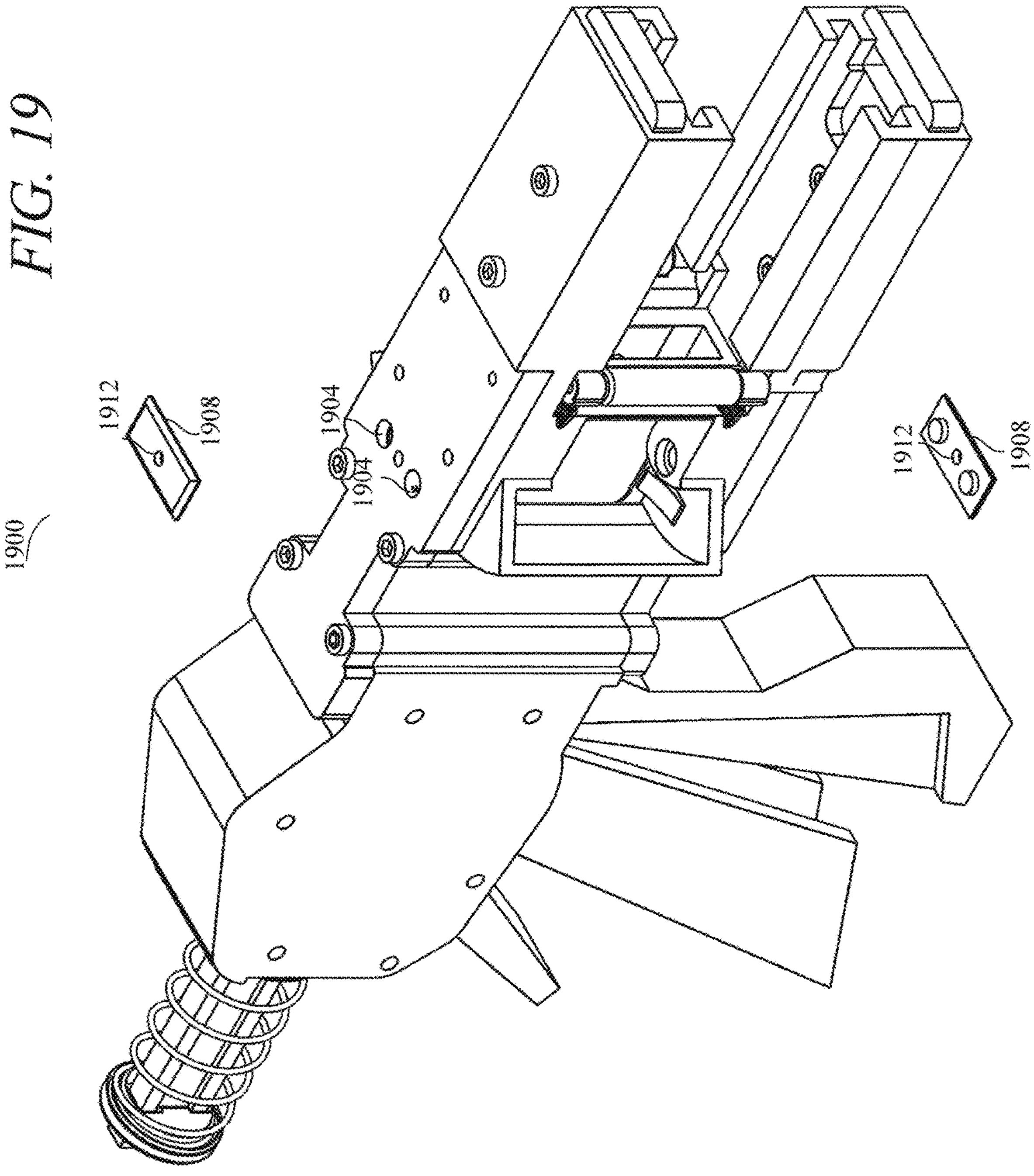
FIG. 19 is a schematic diagram illustrating an exemplary embodiment of a hole cover.

Referring now to FIG. 19, an exemplary embodiment 1900 of a hole cover is illustrated. In an embodiment, electrical connection forming tool 100 may contain one or more holes 1904 configured to house a spring loaded alignment pop up feature. In an embodiment, a hole cover 1908 may be configured to attach over one or more holes 1904 and cover up a hole 1904 that houses a spring loaded alignment pop up feature. In an embodiment, a hole cover 1908 may snap onto electrical connection forming tool 100. In yet another non-limiting example, a hole cover 1908 may be secured to electrical connection forming tool 100 using a screw and/or any other connection mechanism as described above in more detail. In an embodiment, a hole cover 1908 may contain a hole 1912, configured to house a screw and/or any other connection mechanism configured to attach hole cover 1908 to electrical connection forming tool 100. In an embodiment, a hole 1904 located on electrical connection forming tool 100 may be aligned with a hole 1912 located on hole cover 1908.

Figure 20:
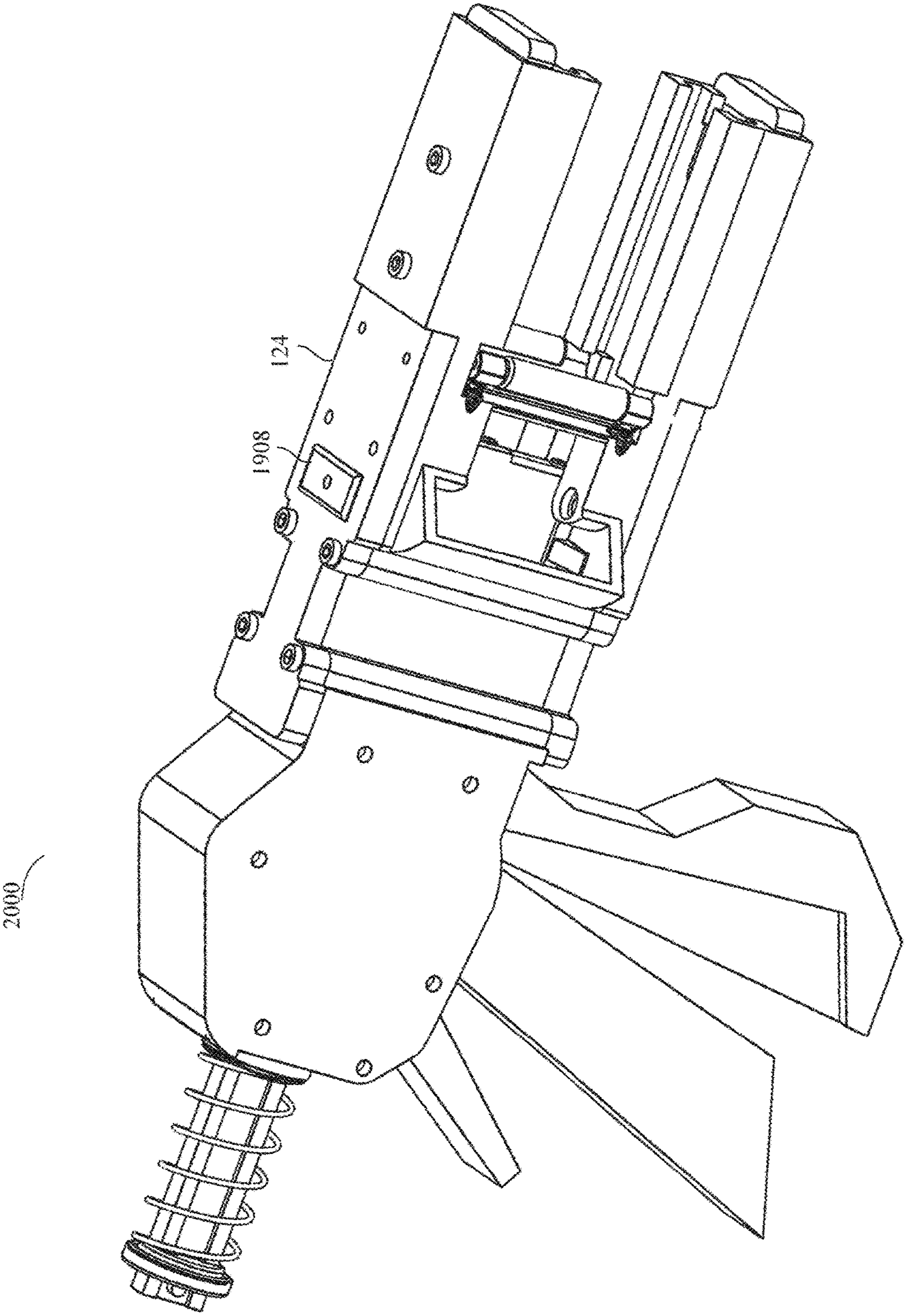
FIG. 20 is a schematic diagram illustrating an exemplary embodiment of an attached hole cover.

Referring now to FIG. 20, an exemplary embodiment 2000 of an attached hole cover is illustrated. In an embodiment, an attached hole cover 1908 may shield one or more holes configured to house a spring loaded alignment pop up feature. In an embodiment, hole cover 1908 may be attached to electrical connection forming tool using a snap on feature, a screw, and/or any other connection mechanism as described above in more detail. In an embodiment, hole cover 1908 may be located on actuator housing 124.

Figure 21:
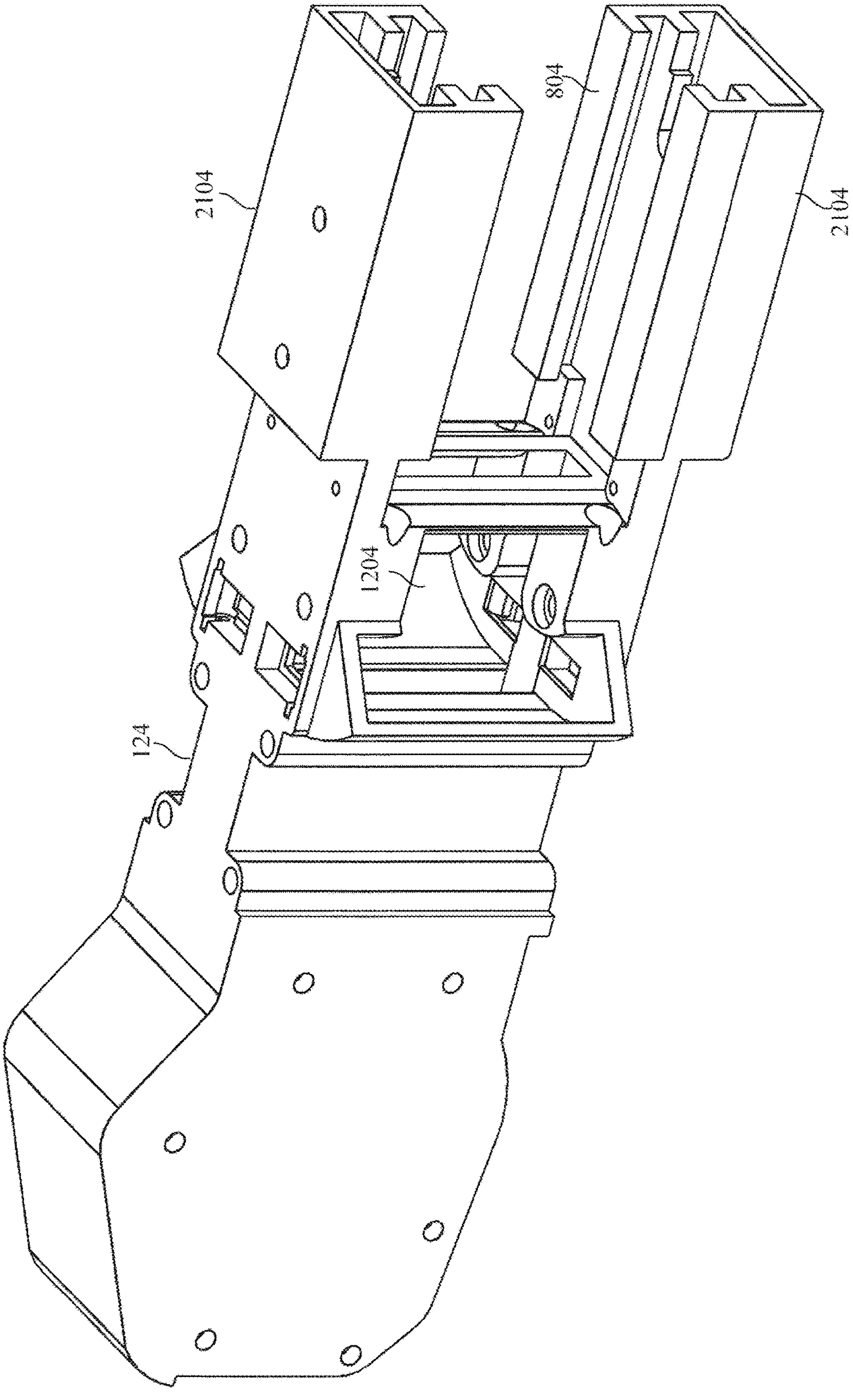
FIG. 21 is a schematic diagram illustrating an exemplary embodiment of an actuator housing.

Referring now to FIG. 21, an exemplary embodiment 2100 of an actuator housing 124 is illustrated. Actuator housing 124 connects a wire forming die module 104 to actuator 120. Actuator housing 124 includes an opening 1204, configured to communicate with die 220 and chamber 208. Actuator housing 124 provides a guided path for a pressing piston to travel, when pushing an electrical plug 1208 into die. In an embodiment, an electrical plug 1208 may be loaded into electrical connection forming tool 100, through opening 1204. In an embodiment, actuator housing 124 may include a docking station 2104, that may aid in aligning wire forming die module 104 with actuator housing 124, to enable wire forming die module 104 to dock and attach to actuator housing 124. In an embodiment, docking station 2104 may include a track 804, that may enable wire forming die module 104 to slide into and attach to actuator housing 124.

Figure 22:
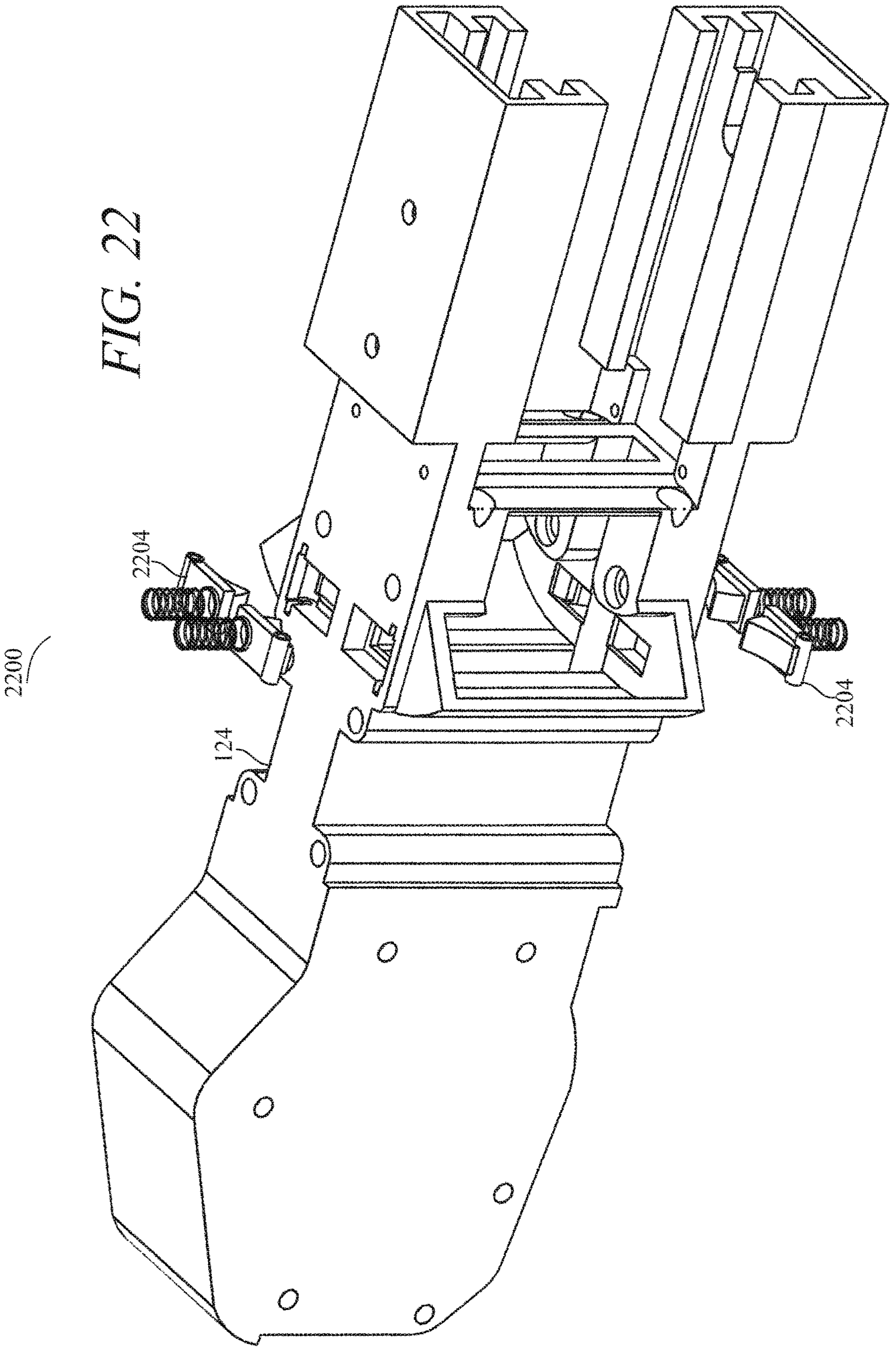
FIG. 22 is a schematic diagram illustrating an exemplary embodiment of an alignment pop up feature.

Referring now to FIG. 22, an exemplary embodiment 2200 of alignment pop up feature is illustrated. In an embodiment, alignment pop up feature 2204 may be located on a first side of hole cover 1908. Alignment pop up feature 2204 may be spring loaded and allow an electrical plug 1208 loaded within electrical connection forming tool 100 to maintain correct alignment for pressing and interfacing with die 220. Alignment pop up feature 2204 may enable one way entry of an electrical plug 1208 into chamber 208 for pressing.

Figure 23:
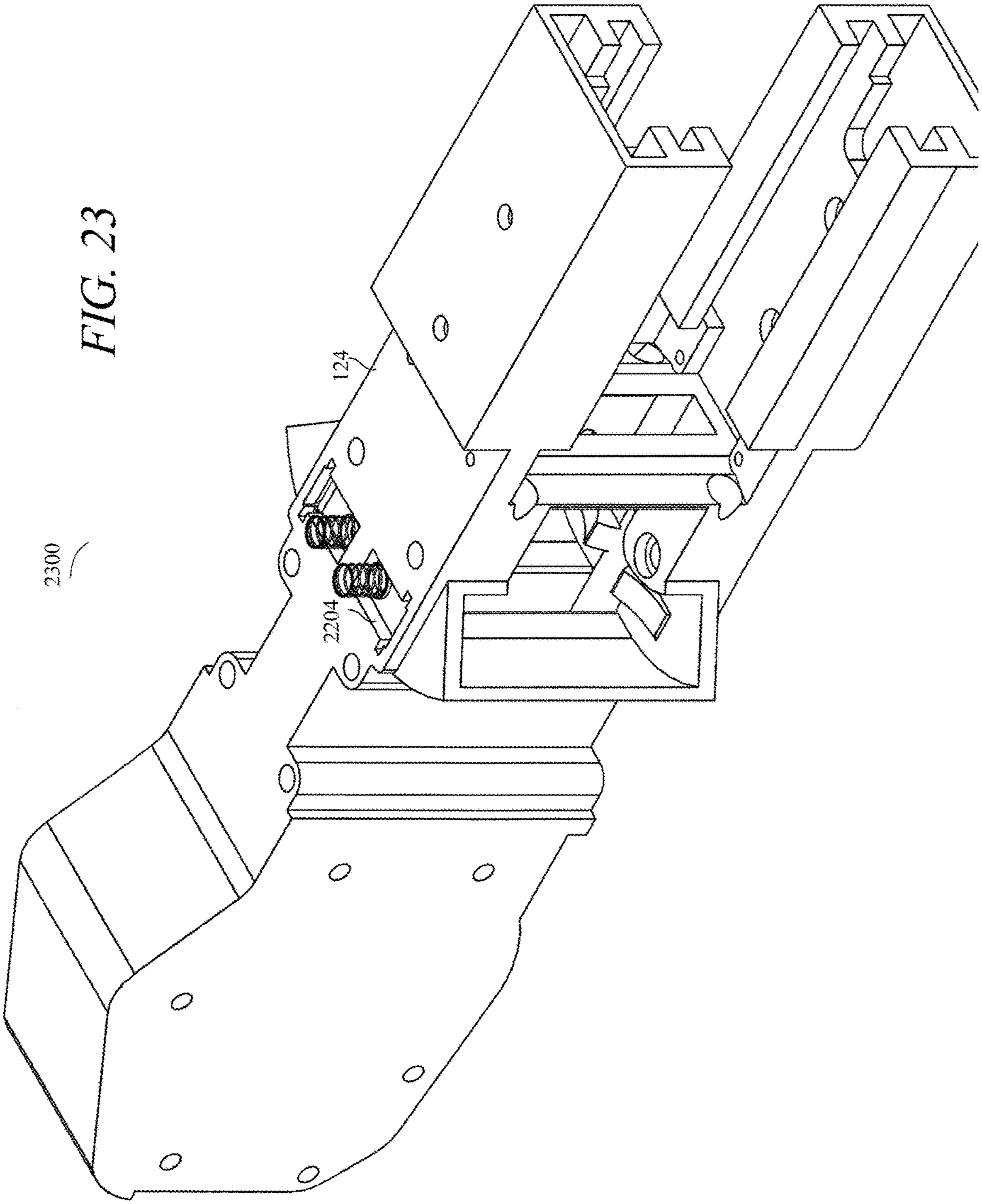
FIG. 23 is a schematic diagram illustrating an exemplary embodiment of an alignment pop up feature installed in an actuator housing.

Referring now to FIG. 23, an exemplary embodiment 2300 of alignment pop up feature installed in an actuator housing is illustrated. In an embodiment, alignment pop up feature 2204 may be located on actuator housing 124. In an embodiment, alignment pop up feature 2204 may be pressed into one or more openings located within actuator housing 124.

Figure 24:
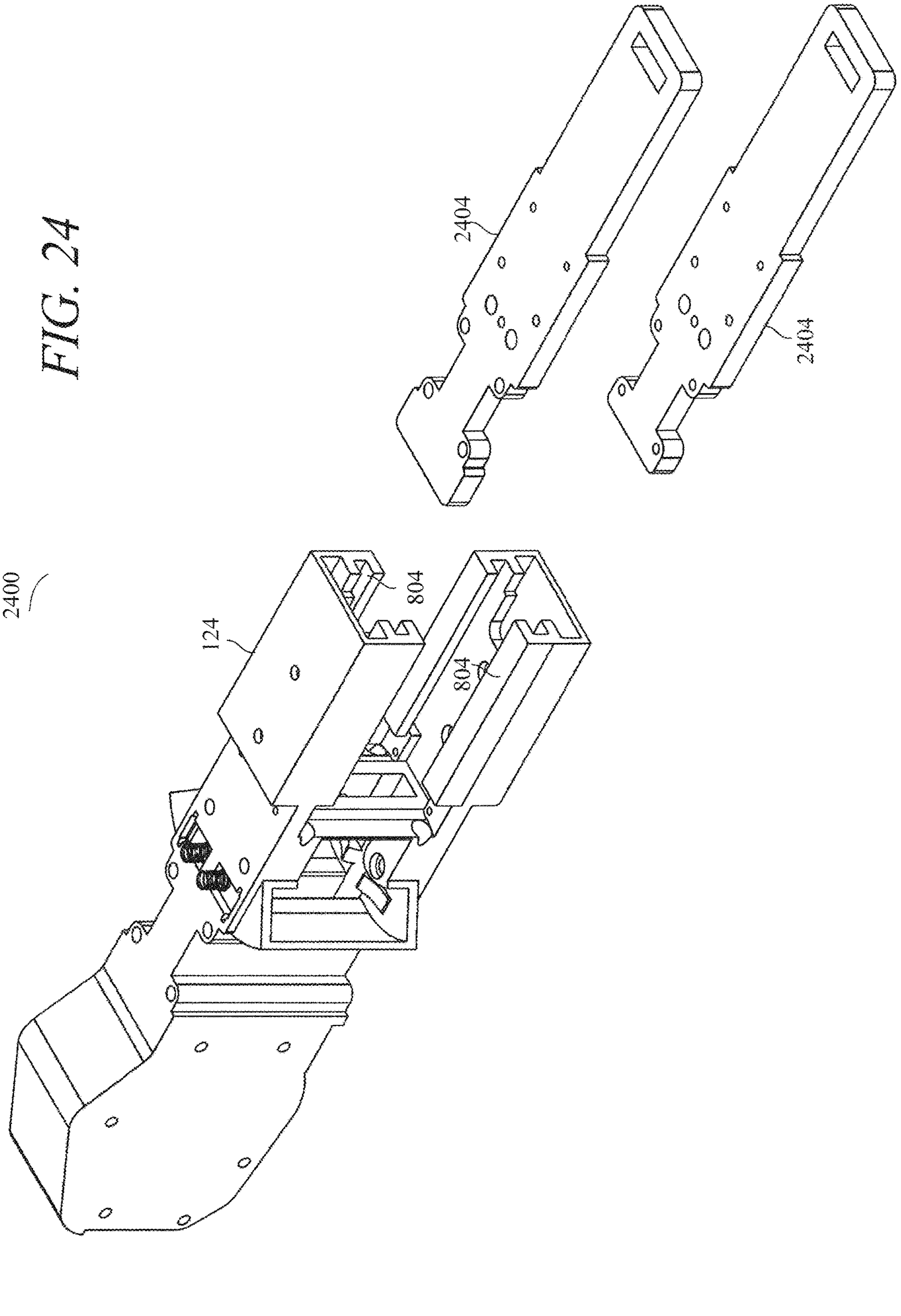
FIG. 24 is a schematic diagram illustrating an exemplary embodiment of structural chassis components.

Referring now to FIG. 24, an exemplary embodiment 2400 of structural chassis is illustrated. A structural chassis 2404 may aid in providing structural integrity to electrical connection forming tool 100, and to aid in withstanding force of pressing. A structural chassis 2404 may be composed of one or more materials, including but not limited to aluminum and/or any other composites. In an embodiment, electrical connection forming tool 100 may contain one structural chassis 2404. In an embodiment, electrical connection forming tool 100 may contain two structural chassis 2404, such as an upper structural chassis 2404 and a lower structural chassis 2404. In an embodiment, electrical connection forming tool 100 may contain two structural chassis 2404, where each structural chassis 2404 may sandwich actuator housing 124.

Figure 25:
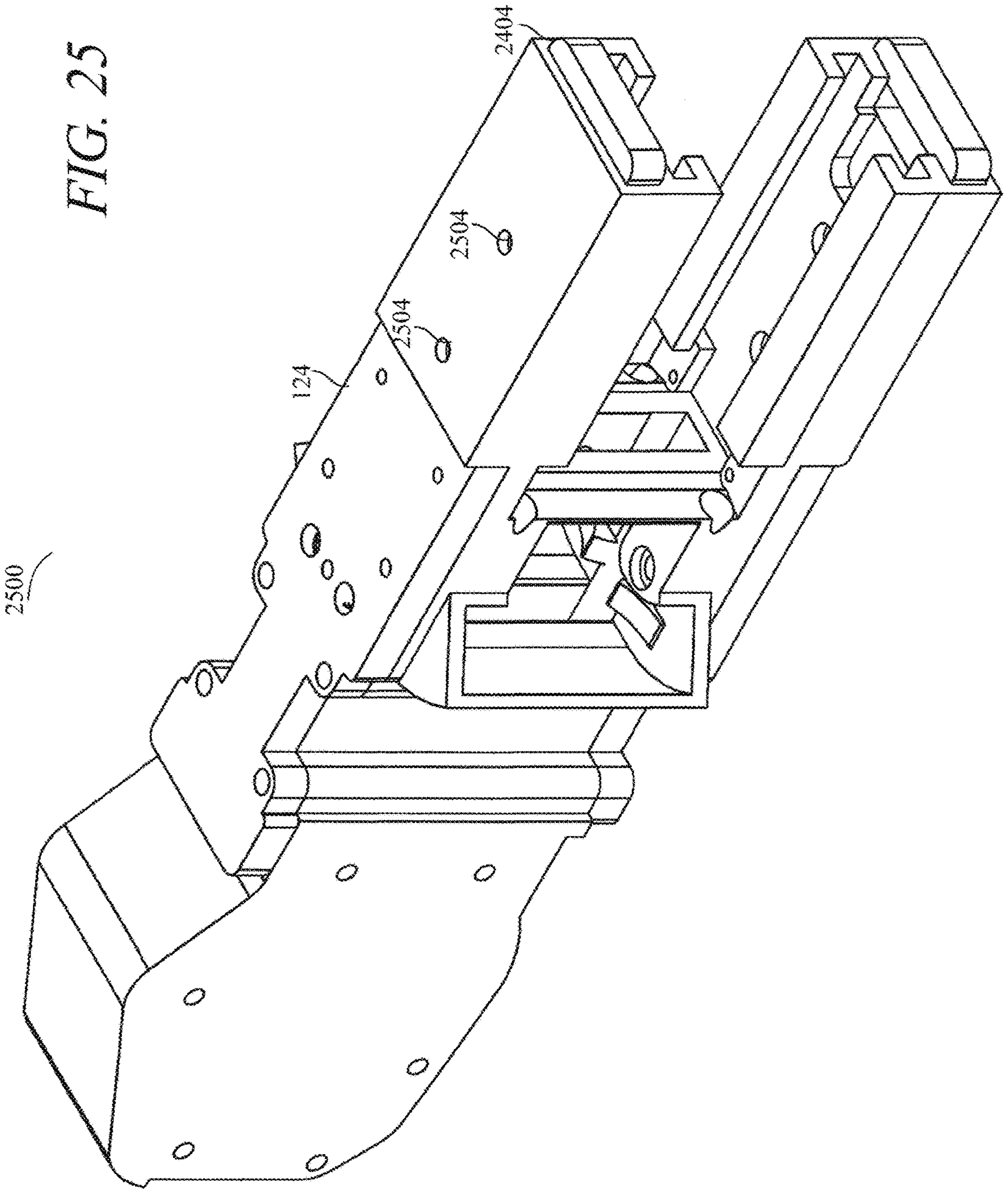
FIG. 25 is a schematic diagram illustrating an exemplary embodiment of actuator housing with structural chassis installed.

Referring now to FIG. 25, an exemplary embodiment 2500 of actuator housing with structural chassis installed is illustrated. Structural chassis 2404 may be attached to actuator housing 124 using a through bolt, screw, and/or any other connection mechanism, which may be placed within opening 2408. In an embodiment, opening 2408 located on structural chassis 2404 may be aligned with one or more openings 2504 located within actuator housing 124. Opening 2504 located within actuator housing 124 may align with opening 2408 located within structural chassis 2404, to allow for integration of the two components.

Figure 26:
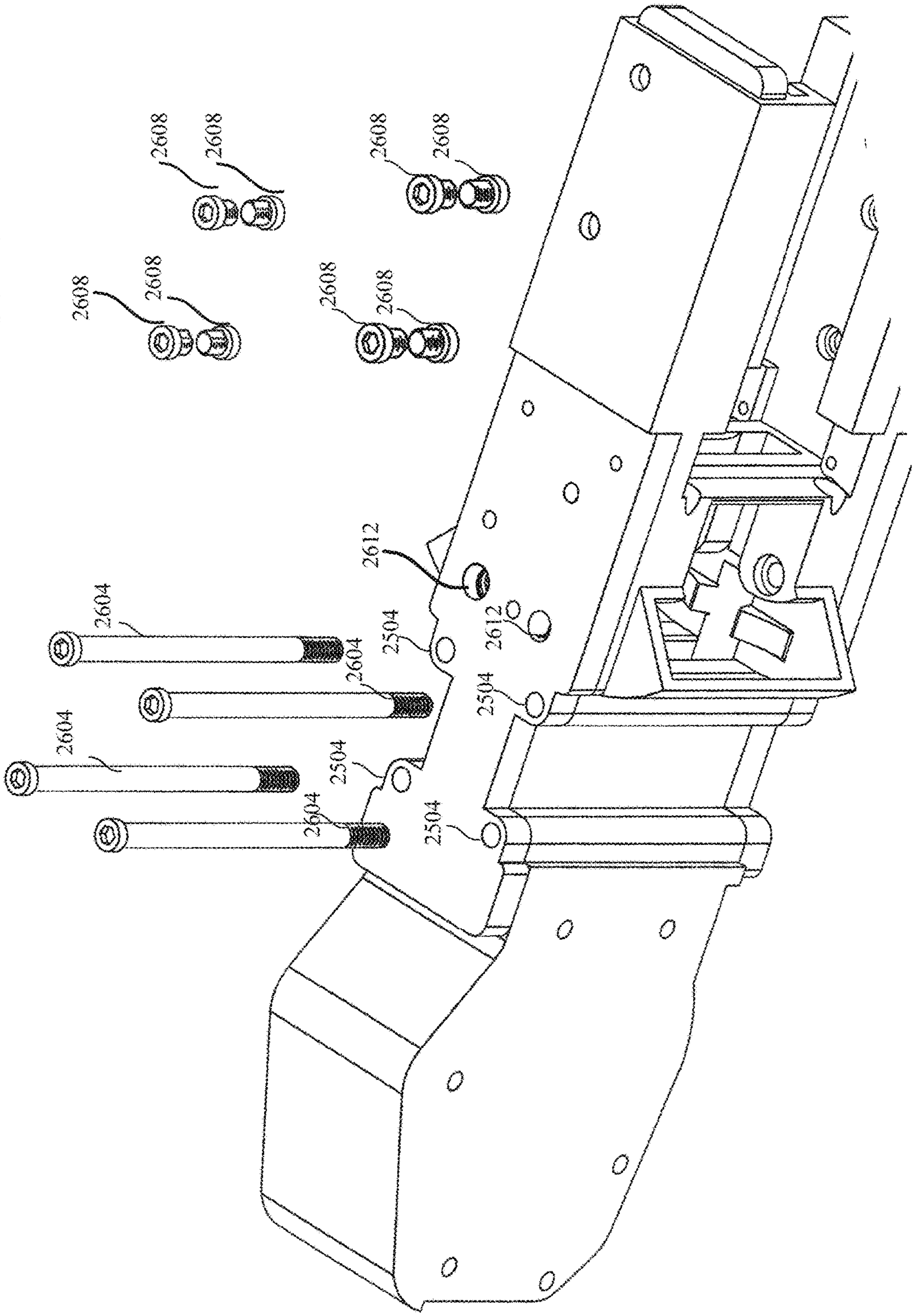
FIG. 26 is a schematic diagram illustrating an exemplary embodiment of structural integration of actuator housing and structural chassis.

Referring now to FIG. 26, an exemplary embodiment 2600 of structural integration of actuator housing and structural chassis is illustrated. In an embodiment, actuator housing 124 may integrate with structural chassis 2404 using a through bolt 2604 and/or a screw 2608. In an embodiment, a through bolt 2604 and/or a screw 2608 may align and enter opening 2504 located within actuator housing 124, and opening 2408 located within structural chassis 2404, allowing for structural integration and alignment of actuator housing 124 and structural chassis 2404. In an embodiment, exterior surface of electrical connection forming tool 100 may contain an opening 2612, configured to accept one or more components of wire feed roller 128. Opening 2612 may accommodate a through bolt, screw, and/or any other connection mechanism as described herein, to attach structural chassis 2404 to actuator housing 124. In an embodiment, structural chassis 2404 may slide onto a track 804, that may accept and/or secure a structural chassis 2404 to actuator housing 124.

Figure 27:
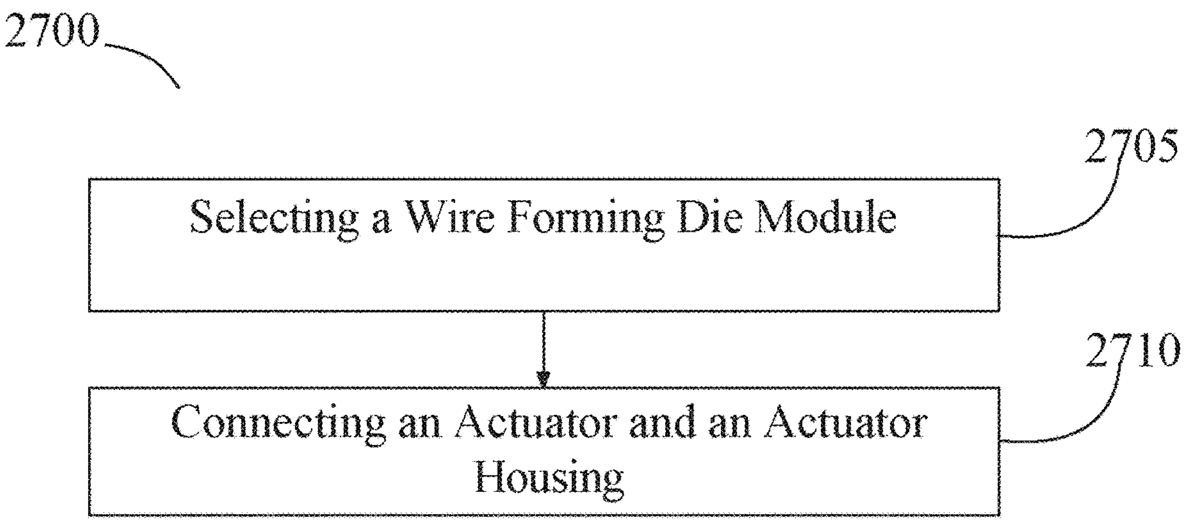
FIG. 27 is a flow diagram illustrating an exemplary embodiment of a method of manufacturing an electrical connection forming tool.

Referring now to FIG. 27, an exemplary embodiment 2700 of a method of manufacturing an electrical connection forming tool is illustrated. At step 2705, a wire forming die module is selected. A wire forming die module includes any of the wire forming die modules as described above in more detail in reference to FIGS. 1-26. In an embodiment, a wire forming die module may be selected as a function of a wire size identifier, specifying what size and/or type of wire a wire forming die module may accommodate. For instance and without limitation, a wire size identifier may specify that a wire forming die module can accommodate a power transmission wire, and/or a communication wire. In an embodiment, wire size identifier may contain a color code which matches a Standard Romex™ Cable jacket color, as produced by Southwire Company, LLC of Carrollton Ga., to specify a particular wire size that a wire forming die module can accommodate. For instance and without limitation, a wire size identifier may contain a white color, to indicate that a wire forming die module can accommodate a 14-gauge wire. In yet another non-limiting example, a wire size identifier may contain an orange color, to indicate that a wire forming die module can accommodate a 10-gauge wire. In an embodiment, a wire forming die module may be able to accommodate a plurality of wire types and/or size wires. For example, a wire forming die module may be able to accommodate both a power transmission wire and a communication wire. In yet another non-limiting example, a wire forming die module may be able to accommodate a 10-gauge wire and an 8-gauge wire. In an embodiment, a wire forming die module may be selected based on a wire size identifier, and/or the types of wire that the wire forming die module can accommodate.

With continued reference to FIG. 27, a wire forming die module includes a module housing, including a front side, the front side including a chamber configured to align with an electrical plug, a back side, and an inner compartment, the inner compartment including a coil sliding body feature. Module forming die module includes a die, a sliding body where the sliding body includes a sliding feature support object, a locking feature, and a cover for the locking feature.

With continued reference to FIG. 27, at step 2710, an actuator and an actuator housing are connected to a selected wire forming die module. An actuator includes any of the actuators as described above in more detail in reference to FIGS. 1-26. An actuator includes a first end and a second end and is configured to force an electrical plug into an actuator housing positioned to interface a die. An actuator housing includes any of the actuator housings as described above in more detail in reference to FIGS. 1-26. An actuator housing connects a wire forming die module to an actuator and includes an opening configured to accept an electrical plug and communicate with a die and a chamber. An actuator housing includes a structural chassis. In an embodiment, an actuator and an actuator housing may be one combined component. In an embodiment, an actuator and an actuator housing may be two separate components. An actuator and an actuator housing may be connected to a selected wire forming die module using any of the connection methodologies as described above in more detail in reference to FIGS. 1-26. For example, a wire forming die module may slide into one or more tracks contained within actuator housing. Wire forming die module may be detachable from actuator and/or actuator housing.

Figure 28:
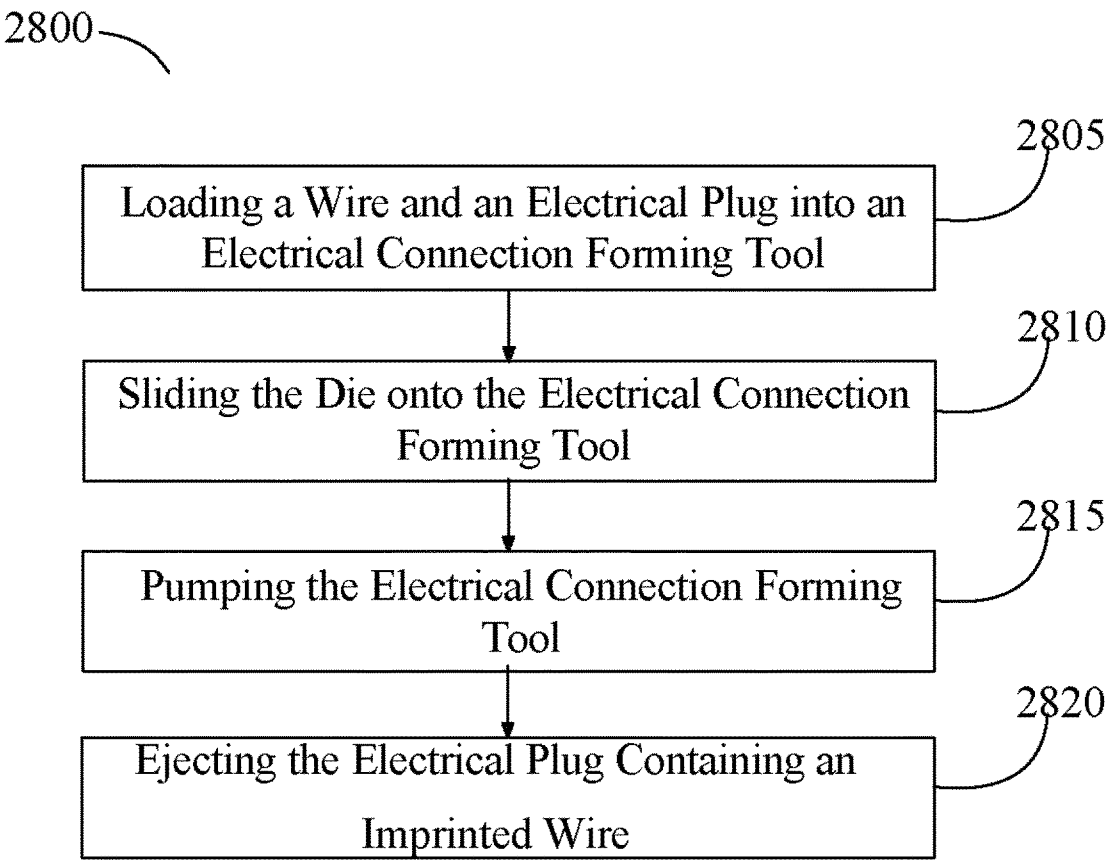
FIG. 28 is a flow diagram illustrating an exemplary embodiment of a method of creating an electrical connection using an electrical connection forming tool.

Referring now to FIG. 28, an exemplary embodiment 2800 of creating an electrical connection using an electrical connection forming tool is illustrated. At step 2805, a wire and an electrical plug are loaded into an electrical connection forming tool. A wire includes any of the wires as described above in more detail in reference to FIGS. 1-27. An electrical plug includes any of the electrical plugs as described above in more detail in reference to FIGS. 1-27. An electrical connection forming tool includes any of the electrical connection forming tools as described above in more detail in reference to FIGS. 1-27. In an embodiment, prior to loading a wire into electrical connection forming tool, the wire may be installed in a wall. Connections to a wire in a wall may be made in line with the wire uncut, or at the end of the wire. A wire may be prepared to be installed into electrical connection forming tool by stripping a section of an outer jacket and/or paper insulation. In an embodiment, a wire may be stripped to a width of 4" and/or 100 mm. In yet another non-limiting example, a wire may be stripped to a width of 23/8" and/or 60 mm. In yet another non-limiting example, a wire may be stripped to a width of 21/2" and/or 65 mm. Loading a wire into an electrical connection forming tool may include spreading one or more wires out, such as by pulling them apart by hand, and/or using a prying tool to pull one or more wires out. One or more spread out wires may then be laid down into a die and loaded into wire forming die module. In an embodiment, a wire may be matched to a wire size identifier contained within a die. In an embodiment, an electrical plug may be loaded into electrical connection forming tool through an opening, located within actuator housing, and configured to accept the electrical plug. In an embodiment, an electrical plug may be inserted by one end first, and pushed into an opening, until it is past alignment pop up feature.

With continued reference to FIG. 28, at step 2810, a wire forming die module slides onto electrical connection forming tool and engages a locking feature. In an embodiment, wire forming die module may slide onto electrical connection forming tool using one or more tracks contained within actuator housing. Sliding wire forming die module onto electrical connection forming tool may include aligning orientation markings. Wire forming die module may slide onto actuator housing until a locking feature has been engaged. Locking feature includes any of the locking features as described above in more detail in reference to FIGS. 1-27. In an embodiment, a locking feature may be secured and/or engaged by hand.

With continued reference to FIG. 28, at step 2815, electrical connection forming tool is pumped, using actuator. Pumping may be done by hand, and/or using a rechargeable power source such as a battery, and/or a motor. In an embodiment, electrical connection forming tool may be held by a human subject with one or more fingers on handle, and one or more fingers on pump. Pumping forces an electrical plug and/or a wire into a die and pressed the wire onto the electrical plug.

With continued reference to FIG. 28, at step 2820, an electrical plug containing a wire imprinted on the electrical plug is ejected from electrical connection forming tool. An electrical plug containing a wire imprinted on the electrical plug may be ejected from electrical connection forming tool by coil sliding body feature contained within wire forming die module. An ejected electrical plug may be finished by hand, where a human subject may fold back any wires against a backside of the electrical plug and secure the wire with a cable tie. In an embodiment, a tool may be used to push an individual wire down as much as possible into a channel located on an electrical plug.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electrical connection forming tool, the tool comprising:
- a wire forming die module, the wire forming die module comprising:
  - a module housing, wherein:
    - the module housing includes a front side, the front side including a chamber configured to align with an electrical plug;
    - a back side; and
    - an inner compartment, the inner compartment including a coil sliding body feature, the coil sliding body feature configured to interface with the electrical plug;
  - a die, and the die is configured to accept a wire and imprint the wire on the electrical plug;
  - a locking feature; and
  - a cover for the locking feature;
- an actuator, wherein:
  - the actuator includes a first end and a second end; and
  - the actuator is configured to force the electrical plug into an actuator housing positioned to interface the die; and
- the actuator housing, wherein;
  - the actuator housing connects the wire forming die module to the actuator;
  - the actuator housing includes an opening configured to accept the electrical plug and communicate with the die and the chamber; and
  - the actuator housing comprises a structural chassis.

2. The tool of claim 1, wherein the wire forming die module comprises a detachable component.

3. The tool of claim 1, wherein the chamber comprises a prong configured to flatten the wire onto the electrical plug.

4. The tool of claim 3, wherein the prong interfaces with a depression located on the electrical plug.

5. The tool of claim 3, wherein the prong is located on the coil sliding body feature.

6. The tool of claim 1, wherein the module housing further comprises an aperture configured to interface with the die.

7. The tool of claim 6, wherein the aperture provides a securing means for the die.

8. The tool of claim 1, wherein the die contains a wire size identifier.

9. The tool of claim 1, wherein the die further comprises a side die imbedded within the module housing.

10. The tool of claim 1, wherein the die further comprises a front die imbedded within the coil sliding body feature.

11. The tool of claim 1, wherein the coil sliding body feature is configured to eject the electrical plug.

12. The tool of claim 1, wherein the coil sliding body feature is supported within the inner compartment using a sliding feature support object.

13. The tool of claim 1, wherein the actuator comprises a pump action actuator.

14. The tool of claim 1, wherein the actuator further comprises a pressing piston located on the first end and a return coil located on the second end.

15. The tool of claim 1, wherein the actuator is operated by a human subject.

16. The tool of claim 1, wherein the actuator is operated by a rechargeable power source.

17. The tool of claim 1, wherein the actuator housing is fixed to the actuator.

18. The tool of claim 1, wherein the actuator housing includes a wire feed roller configured to interface with the wire forming die module and maintain pressure on the wire.

* * * * *